US012293385B2

(12) United States Patent
Okuma et al.

(10) Patent No.: US 12,293,385 B2
(45) Date of Patent: May 6, 2025

(54) INFORMATION PROCESSING APPARATUS AND INFORMATION PROCESSING METHOD

(71) Applicant: TOSHIBA TEC KABUSHIKI KAISHA, Tokyo (JP)

(72) Inventors: Yumiko Okuma, Tokyo (JP); Mayuko Tsunoda, Yokohama Kanagawa (JP); Hikaru Komiyama, Yokohama Kanagawa (JP)

(73) Assignee: Toshiba Tec Kabushiki Kaisha, Tokyo (JP)

( * ) Notice: Subject to any disclaimer, the term of this patent is extended or adjusted under 35 U.S.C. 154(b) by 124 days.

(21) Appl. No.: 18/152,556

(22) Filed: Jan. 10, 2023

(65) Prior Publication Data
US 2023/0419361 A1   Dec. 28, 2023

(30) Foreign Application Priority Data
Jun. 24, 2022 (JP) .................. 2022-101631

(51) Int. Cl.
*G06Q 30/0251* (2023.01)
(52) U.S. Cl.
CPC ................. *G06Q 30/0251* (2013.01)
(58) Field of Classification Search
CPC .......................... G06Q 30/02–0277
See application file for complete search history.

(56) References Cited

U.S. PATENT DOCUMENTS 8,577,753 B1 * 11/2013 Vincent .................. G06Q 30/02
705/26.7
2013/0262256 A1 * 10/2013 Goldberg ............... G06Q 30/08
709/204

FOREIGN PATENT DOCUMENTS

JP    2014032697 A  *  2/2014 ........... G07G 1/0081
JP    2019-220089 A    12/2019

OTHER PUBLICATIONS

Sun et al., "MultSource Pointer Network for Product Tile Summiarization", arXiv: 1803.06385v3 [es.CL], Retrieved C fY.R/ from internet URL: https://amiv.org/pdi/1 608 06855 pdf, Oct. 8, 2018, 10 Pages (Year: 2018).*

* cited by examiner

*Primary Examiner* — Raquel Alvarez
(74) *Attorney, Agent, or Firm* — Kim & Stewart LLP

(57) ABSTRACT

According to an embodiment, a mobile terminal displays a flyer in a first display region of a display device (display unit). The mobile terminal generates a product list containing pieces of information of a plurality of products included in the flyer and displays the generated product list in a second display region of the display device. Further, the mobile terminal generates a shopping note of a product selected from the product list by an operator and displays the generated purchase list on the display device.

8 Claims, 22 Drawing Sheets

27

| Flyer code | Flyer information 58 ||||||||| ... |
|---|---|---|---|---|---|---|---|---|---|---|
| | Store name | Sales date | Adver-tisement region | Product name | Selling price | Adver-tisement region | Product name | Product name | ... | |
| | Sales information ||| Product A ||| Product B ||| ... |

Fig.3

| Product code | Product information ||||
| --- | --- | --- | --- | --- |
| | Product name | Product type | Selling price | ... |

Fig.12

| Customer code | Contact information ||||| 68 |
| --- | --- | --- | --- | --- | --- | --- |
| | Name | Age | Gender | Contact information | Purchase history | ... |

Shopping note information 69

| Customer code | Store code | Generation date and time | Updated date and time | Product code | Product name | Selling price | Sales date | Stock quantity | ... |

| Product code | Stock information | | | | |
|---|---|---|---|---|---|
| | Product name | Store code | Stock check date and time | Stock quantity | ... |

Fig.15

| Transaction code | Transaction information | | | 75 |
|---|---|---|---|---|
| | Customer code | Product code | ... | |

Fig.16

INFORMATION PROCESSING APPARATUS AND INFORMATION PROCESSING METHOD

CROSS-REFERENCE TO RELATED APPLICATIONS

This application is based upon and claims the benefit of priority from the prior Japanese Patent Application No. 2022-101631, filed on Jun. 24, 2022, the entire contents of which are incorporated herein by reference.

FIELD

An embodiment to be described here generally relates to an information processing apparatus and an information processing method.

BACKGROUND

In the past, an information processing apparatus that generates a shopping note in which products that a customer who has browsed an electronic flyer delivered to a mobile terminal has selected and wants or is interested in are registered has been known.

In such an information processing apparatus, since the customer selects a product by touching a product display column displayed on the electronic flyer, he/she needs to select a product after enlarging a screen when selecting a product in a narrow display column, in order to prevent a product in an adjacent display column from being erroneously selected. For this reason, an information processing apparatus that is capable of more easily creating a shopping note and has high operability has been desired.

BRIEF DESCRIPTION OF THE DRAWINGS

FIG. 3 is a diagram showing an example of a data structure of flyer data according to the first embodiment;

FIG. 12 is a diagram showing an example of a data structure of a product master according to the second embodiment;

FIG. 13 is a diagram showing an example of a data structure of a customer master according to the second embodiment;

FIG. 14 is a diagram showing an example of a data structure of shopping note data according to the second embodiment;

FIG. 15 is a diagram showing an example of a data structure of a stock master according to the second embodiment;

FIG. 16 is a diagram showing an example of a data structure of product registration data according to the second embodiment;

DETAILED DESCRIPTION

Figure 1:
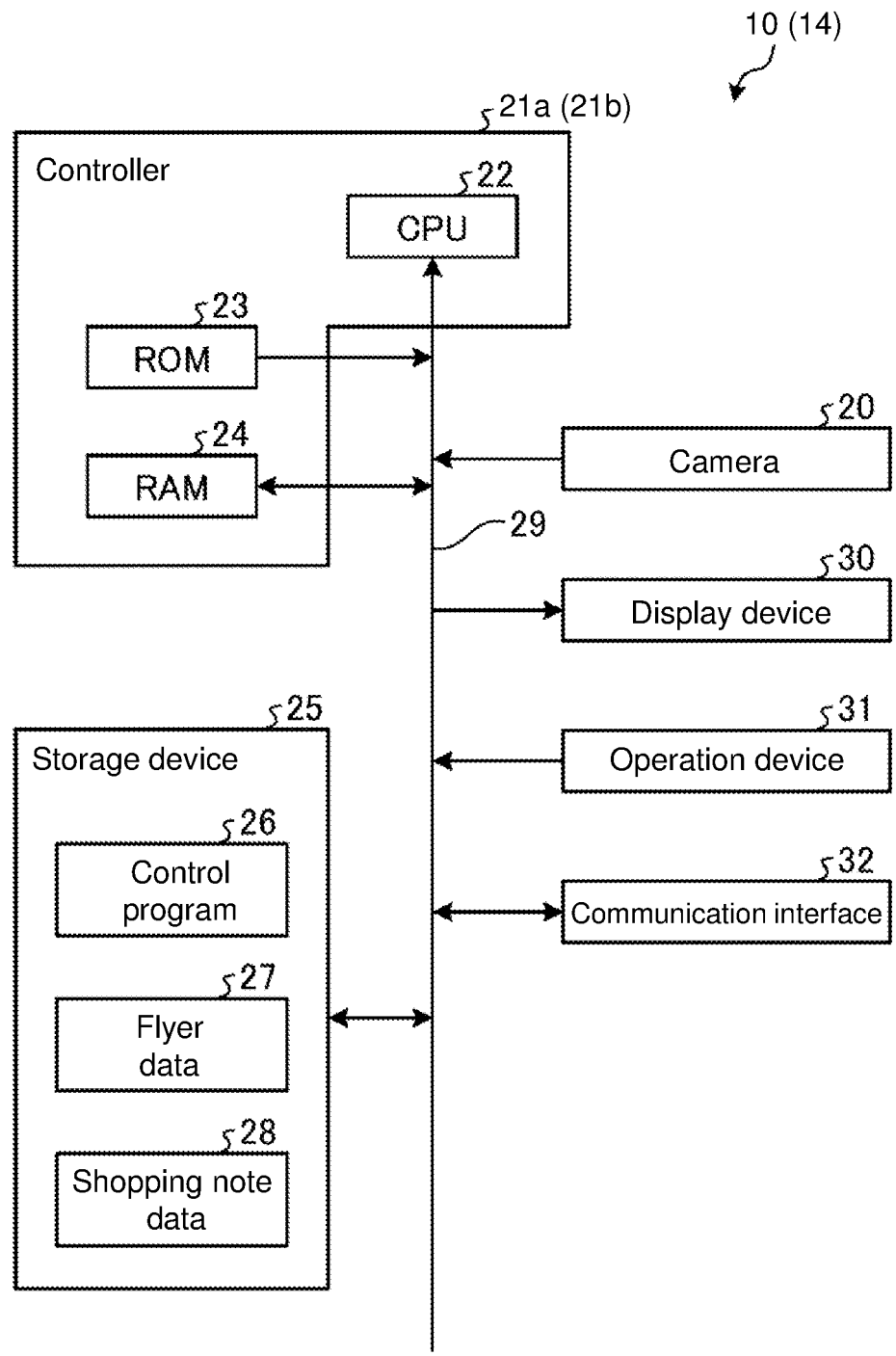
FIG. 1 is a block diagram showing an example of a hardware configuration of a mobile terminal according to a first embodiment.

According to an embodiment, an information processing apparatus includes: a display device; a storage device; and a controller. The display device displays information for supporting shopping of products. A display screen for displaying the information has a first display region and a second display region. The storage device stores data regarding shopping of products. The data includes data of a flyer containing pieces of information of products sold in a store and data of a shopping note for purchasing a product.

The controller displays the flyer in the first display region of the display device on the basis of the data of the flyer stored in the storage device. The controller generates a product list containing information of a plurality of products included in the flyer. The controller displays the generated product list in the second display region of the display device such that a product is selectable by an operator. The controller determines whether or not a product has been selected from the product list. The controller generates, where it is determined that a product has been selected, data of a shopping note containing information of the selected product and stores the generated data of the shopping note in the storage device. Further, the controller displays the shopping note in the second display region of the display device on the basis of the data of the shopping note stored in the storage device.

First Embodiment

An embodiment in which an information processing apparatus according to this embodiment is applied to a mobile terminal 10 will be described with reference to the drawings. In the drawings, the same reference symbols denote the same or similar portions. The mobile terminal 10 acquires an electronic flyer of a store, which is delivered via a communication line, and displays the acquired electronic flyer such that a customer can browse the electronic flyer. When the customer finds a product that he/she wants while browsing the electronic flyer, he/she registers the product in a shopping note. When the release date of the product registered in the shopping note has come, the mobile terminal 10 notifies the customer of that it is the release date of the registered product. Further, the mobile terminal 10 scans a product code when a customer shops in a store or the like. The mobile terminal 10 transmits the scanned product code to, for example, a server apparatus (not shown) and causes the server apparatus to perform product registration. Further, the mobile terminal 10 performs payment processing relating to purchased products by itself or causes, via the server apparatus, an adjustment apparatus such as a POS terminal connected to the server apparatus to perform account processing or payment processing. Note that the mobile terminal 10 is, for example, a smartphone, a tablet terminal, or a laptop computer. The mobile terminal 10 is an example of an information processing apparatus according to the present disclosure.

(Hardware Configuration of Mobile Terminal)

A hardware configuration of the mobile terminal 10 will be described with reference to FIG. 1. FIG. 1 is a block diagram showing an example of a hardware configuration of the mobile terminal according to the first embodiment.

The mobile terminal 10 includes a controller 21a for controlling the respective units of the mobile terminal 10. The controller 21a includes a processor and a memory. The processor includes, for example, a CPU (Central Processing Unit) 22. The memory includes a ROM (Read Only Memory) 23 and a RAM (Random Access Memory) 24. The CPU 22 is connected to the ROM 23 and the RAM 24 via an internal bus 29 such as an address bus and a data bus. The CPU 22 develops various programs stored in the ROM 23 or a storage device 25 into the RAM 24. The CPU 22 operates in accordance with the various programs developed into the RAM 24 to control the mobile terminal 10. That is, the controller 21a has a configuration of a general computer.

The controller 21a is connected to the storage device 25, a camera 20, a display device 30, an operation device 31, and a communication interface 32 via the internal bus 29.

The storage device 25 is a storage device such as a hard disk drive (HDD) and a solid state drive (SSD). Further, the storage device 25 may be a non-volatile memory such as a flash memory in which stored information is retained even when the power source is turned off. The storage device 25 stores a control program 26, flyer data 27, and shopping note data 28.

The control program 26 is a program that controls the operation of the entire mobile terminal 10.

The flyer data 27 is an electronic flyer with bargains or the like. The electronic flyer is delivered from a store and acquired via a communication line. The flyer data 27 includes a flyer 80 (see FIG. 2) as image information and flyer information 58 storing information regarding, for example, placement of products in the flyer 80. A specific data structure of the flyer information 58 will be described below in detail (see FIG. 2). Note that the flyer data 27 may be delivered in a push-based manner or may be delivered when a customer requests, in accordance with the customer's settings.

The shopping note data 28 is data of a product that a customer who has browsed the flyer 80 wants or is interested in and is selected from the flyer 80 by the customer. A specific example of the shopping note data 28 will be described below in detail (see FIG. 4A to FIG. 4C).

The camera 20 reads a barcode or a two-dimensional code including a product code, which is attached to a product.

The display device 30 displays a screen generated in accordance with an instruction of the controller 21a. The display device 30 is, for example, a device such as a liquid crystal display (LCD) and an organic electro-luminescence (EL) device. Note that the display device 30 is an example of a display unit according to the present disclosure.

The operation device 31 receives an operator's input operation and outputs it to the controller 21a. The operation device 31 includes, for example, a device such as a touch panel and a keyboard.

The communication interface 32 is an interface for communicating with a server apparatus (not shown) that delivers the flyer data 27.

(Data Structure of Flyer Information)

Figure 2:
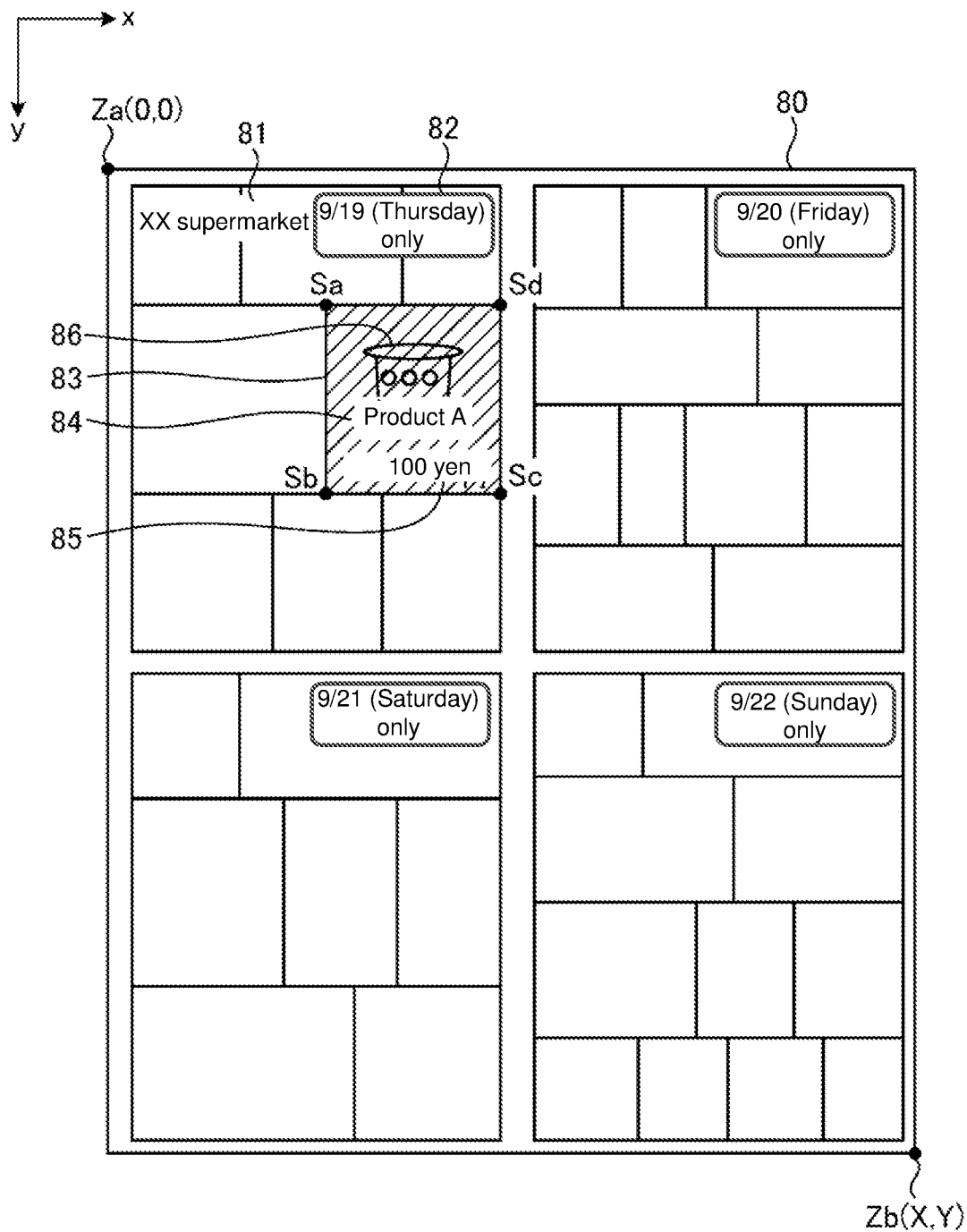
FIG. 2 is a diagram showing an example of a data structure of an electronic flyer according to the first embodiment.

A data structure of the flyer information 58 will be described with reference to FIG. 2 and FIG. 3. FIG. 2 is a diagram showing an example of a data structure of an electronic flyer. FIG. 3 is a diagram showing an example of a data structure of flyer data.

As shown in FIG. 2, the flyer 80 includes information of a store name 81, a sales date 82, a product name 84, a selling price 85, and product appearance 86.

The store name 81 is a name of a store selling the products listed on the flyer 80.

The sales date 82 represents a period in which the products listed on the flyer 80 are sold at the prices listed on the flyer 80. The sales date 82 represents a specific date (e.g., September 19th (Thursday) only) or a specific period (e.g., from September 19th (Thursday) to September 22nd (Sunday)).

The product name 84 is a name of a product.

The selling price 85 is a selling price of a product.

The product appearance 86 represents an image or illustration showing the appearance of a product.

Information regarding a product (the product name 84, the selling price 85, and the product appearance 86) is displayed in an advertisement region 83. The advertisement region 83 is a partitioned region in the flyer 80. Although each of the advertisement regions 83 is a rectangular region in the example shown in FIG. 2, the present disclosure is not limited thereto. For example, the advertisement region 83 may be a curved region or a polygonal region. Further, although adjacent advertisement regions 83 are in contact with each other in the example shown in FIG. 2, a space may be provided between the adjacent advertisement regions 83.

The flyer data 27 includes a flyer code and the flyer information 58. As shown in FIG. 3, the flyer information 58 is associated with the flyer code. The flyer code is a code for uniquely specifying the flyer 80. The flyer information 58 includes sales information and information relating to a product. The sales information and the information relating to a product are associated with each other.

Specifically, the flyer information 58 includes, as sales information, a store name and a sales date. The store name may be an actual store name or a store code.

The flyer information 58 includes, as information relating to a product, a range of the advertisement region 83 (hereinafter, referred to simply as the advertisement region 83 in some cases). In the example of the flyer 80 shown in FIG. 2, the advertisement region 83 is stored as coordinate values Sa, Sb, Sc, and Sd of four corners. Note that the coordinate values are specified in an xy coordinate system with the upper left of the flyer 80 as an origin Za (0,0) and the lower right of the flyer 80 as Zb (X,Y). Note that in the case where the advertisement region 83 is not a rectangular region, information capable of specifying coordinates of the outer edge and internal coordinates of the advertisement region 83 is stored. Note that the advertisement region 83 may be managed with page information such as a page number of the flyer 80 instead of managing a product column with coordinate values. Specifically, the page number of the flyer 80 and the product listed on the page corresponding to the page number may be managed in association with each other.

The flyer information 58 further includes, as information relating to a product, the product name 84 and the selling price 85 displayed in the advertisement region 83, in association with the advertisement region 83.

(Method of Generating Shopping Note)

Figure 4A:
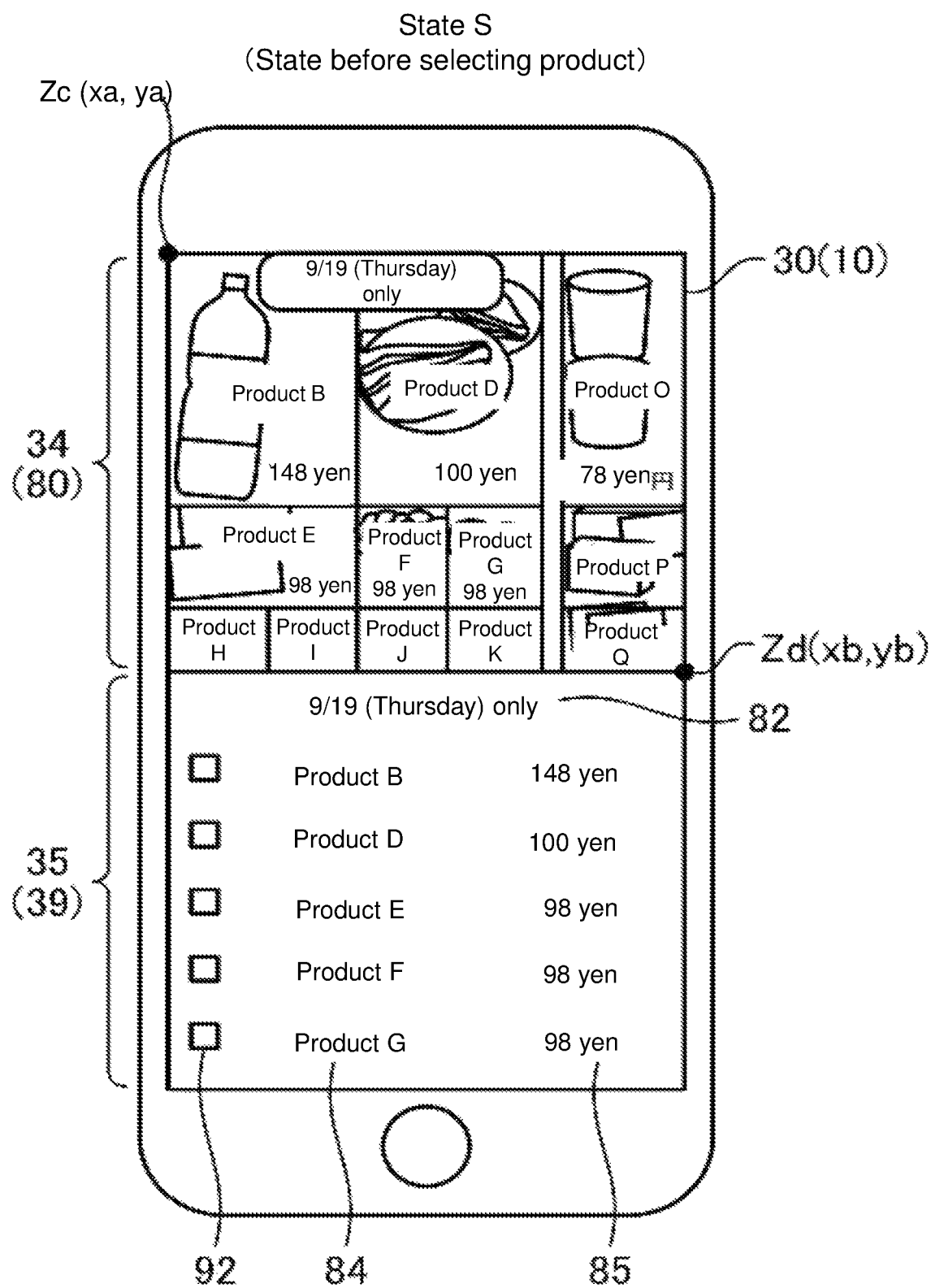
FIG. 4A is a diagram showing an example of a procedure for generating a shopping note in the mobile terminal according to the first embodiment.
Figure 4B:
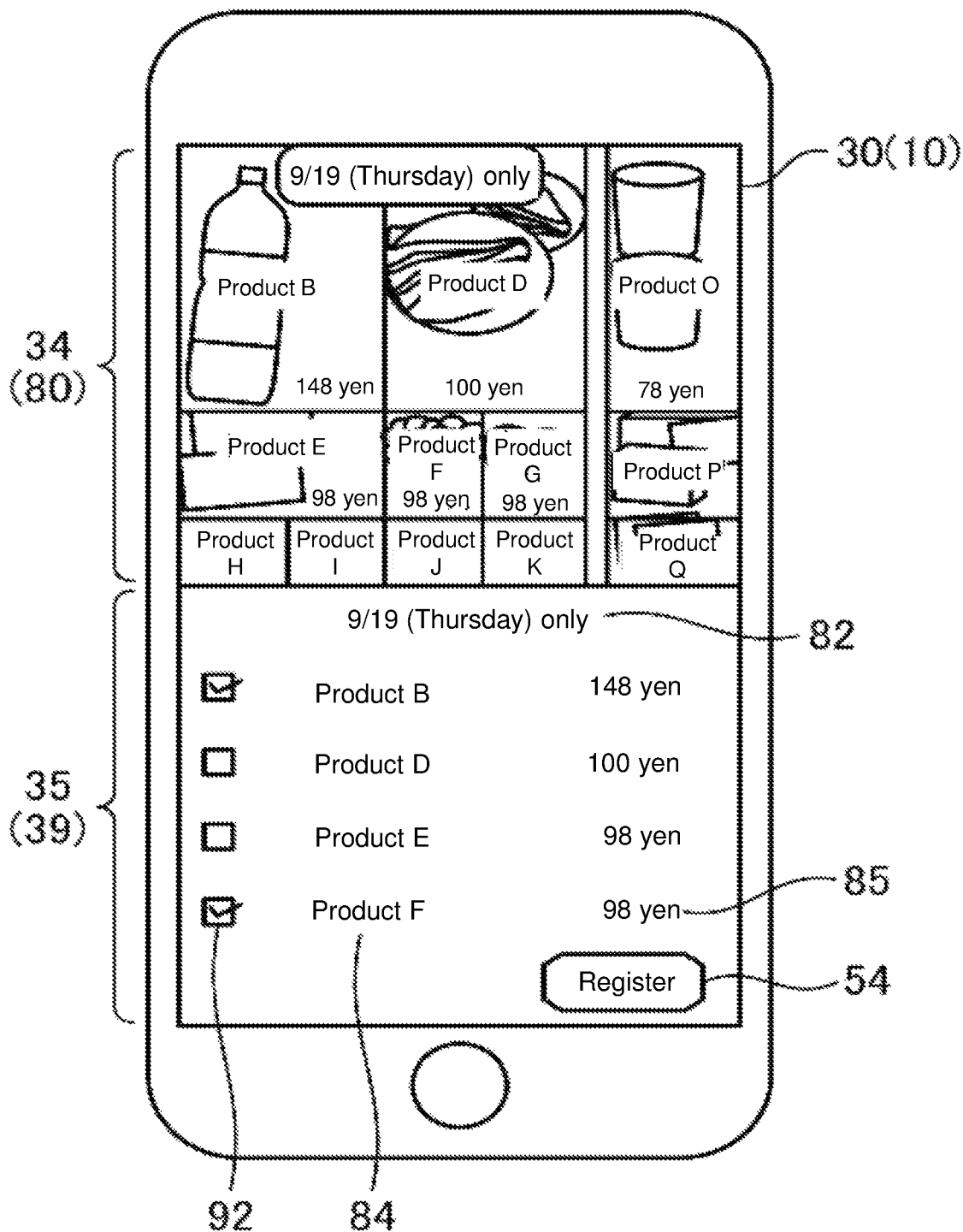
FIG. 4B is a diagram showing an example of the procedure for generating a shopping note in the mobile terminal according to the first embodiment.
Figure 4C:
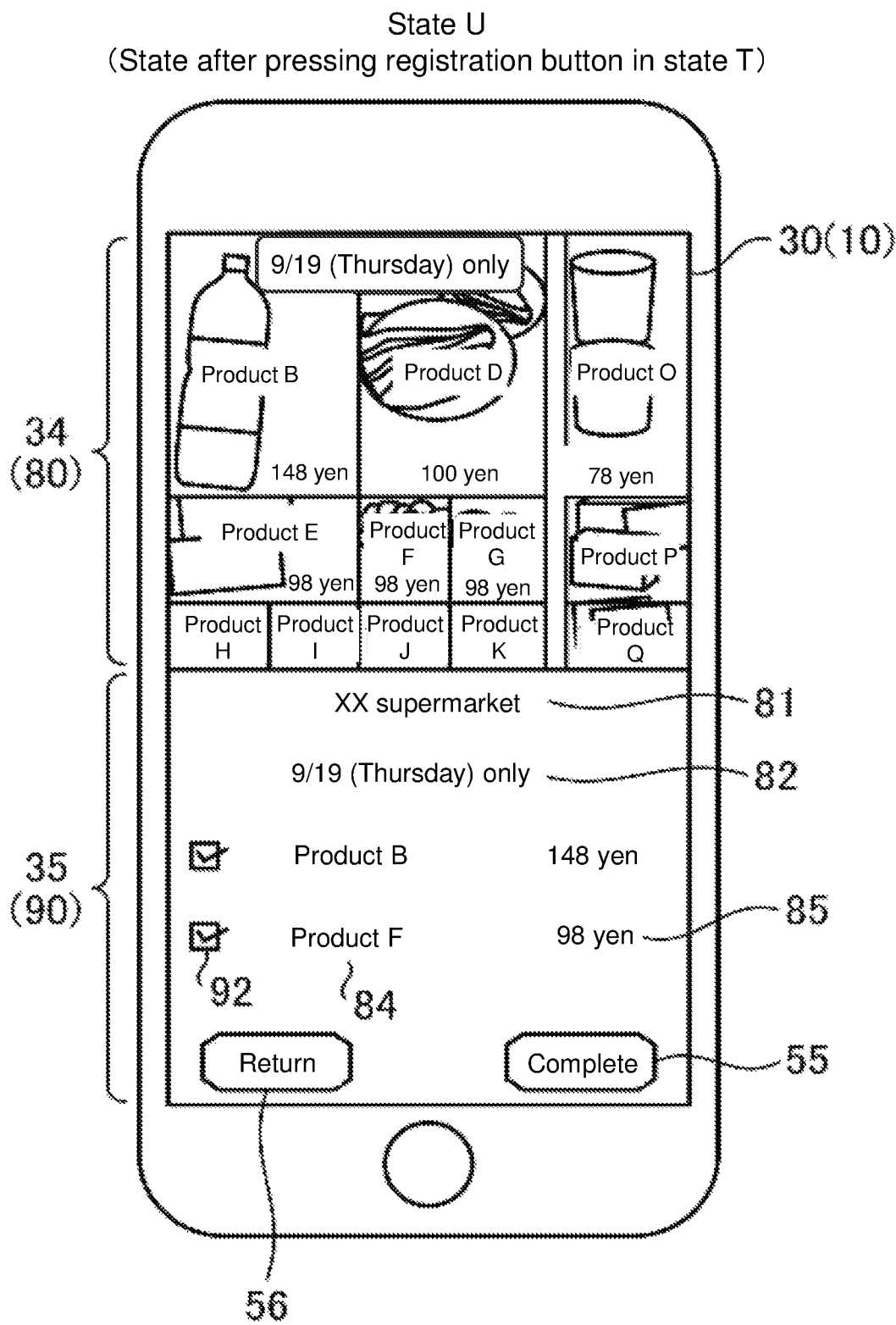
FIG. 4C is a diagram showing an example of the procedure for generating a shopping note in the mobile terminal according to the first embodiment.

A method of generating a shopping note in the mobile terminal 10 will be described with reference to FIG. 4A to FIG. 4C. FIG. 4A to FIG. 4C are each a diagram showing an example of a procedure for generating a shopping note in the mobile terminal according to the first embodiment.

A state S shown in FIG. 4A shows an example in which the flyer 80 is displayed on the upper part (first display region 34) of the display device 30 of the mobile terminal 10 and a product list 39 is displayed on the lower part (second display region 35) of the display device 30.

A customer causes an application for acquiring the flyer 80 in the mobile terminal 10 to operate. The mobile terminal 10 acquires the flyer 80 and displays the acquired flyer 80 in the first display region 34 of the mobile terminal 10 such that the customer can browse the flyer 80.

The customer can freely browse the flyer 80 displayed in the first display region 34 by enlarging/reducing or scrolling the flyer 80.

The mobile terminal 10 generates a list (product list 39) of the products included in the flyer 80 displayed in the first display region 34. The mobile terminal 10 displays the generated product list 39 in the second display region 35.

More specifically, the mobile terminal 10 reads coordinate values Zc (xa, ya) on the upper left side and coordinate values Zd (xb, yb) on the lower right side of the flyer 80 displayed in the first display region 34. The mobile terminal 10 specifies the coordinate range of the rectangular region with the read coordinate values Zc (xa, ya) and the read coordinate values Zd (xb, yb) as the diagonal. Further, the mobile terminal 10 checks the specified coordinate range of the rectangular region against the flyer information 58 to specify the product included in the rectangular region. The mobile terminal 10 acquires, from the flyer information 58, the sales date 82, the product name 84, and the selling price 85 corresponding to the specified product. Information regarding the product specified in this way is displayed in the product list 39.

Therefore, in the case where the customer enlarges/reduces the flyer 80 or scrolls the flyer 80, the product displayed in the first display region changes, so that the display content of the product list 39 changes in accordance therewith.

The product list 39 includes the sales date 82, the product name 84, the selling price 85, and a check box 92. Each of the sales date 82, the product name 84, and the selling price 85 is information listed on the flyer 80.

The check box 92 is an operating element to be checked when a customer selects a product to be registered in a shopping note.

Note that since the area of the second display region 35 is limited, all pieces of product information displayed on the display device 30 cannot be seen in the product list 39 in some cases. In such a case, the customer can check all pieces of product information displayed on the display device 30 by scrolling the product list 39 up and down.

Note that the size of each of the first display region 34 and the second display region 35 can be arbitrarily set in a setting screen or the like by the customer. Further, in the case where the page number of the flyer 80 and the product are managed in association with each other, the product list 39 of the product associated with the page number displayed in the first display region 34 may be displayed in the second display region 35.

A state T shown in FIG. 4B shows an example of a state in which a customer has checked the product list 39 and selected a product that he/she wants or is interested in.

A product is selected by pressing the check box 92. A check mark is placed in the check box 92 in the row of the selected product. The example of the state T in FIG. 4B shows a state in which a product B and a product F have been selected.

When at least one product is selected in the product list 39, a shopping note registration button 54 is displayed at the bottom of the product list 39 as shown in FIG. 4B. When the shopping note registration button 54 is pressed, the selected product in the product list 39 is registered in a shopping note 90 as a product to be purchased.

A state U shown in FIG. 4C shows a state in which the shopping note 90 has been generated after the shopping note registration button 54 is pressed in the state T.

The shopping note 90 is displayed in the second display region 35. In the example of the state U shown in FIG. 4C, both the flyer 80 displayed in the first display region 34 and the shopping note 90 displayed in the second display region 35 are displayed. In the case where the size of the second display region 35 is set to the entire screen of the display device 30, the shopping note 90 is displayed on the entire screen. Note that the shopping note 90 displayed on the screen can be scrolled up and down. As a result, it is possible to check the entire shopping note 90 even in the case where the amount of registered products is large.

In the shopping note 90, the store name 81, the sales date 82, the product name 84, the selling price 85, the check box 92, a shopping-note-registration-complete button 55, and a return button 56 are displayed.

The store name 81 is a name of a store selling the products listed on the flyer 80. Note that there are a plurality of stores corresponding to the flyer 80 in some cases. In such a case, a customer may be caused to select a store before registering a shopping note in the state T.

The sales date 82 represents a period in which the selected product is sold at the price listed on the flyer 80. The sales date 82 represents a specific date or a specific period. Note that the products registered in the shopping note 90 include products with different sales periods in some cases. In such a case, the shopping note 90 is generated separately for each sales date. A product sold at a plurality of dates is registered in columns of the plurality of dates in duplicate.

The product name 84 is a name of a product listed on the flyer 80.

The selling price 85 is a selling price of a product listed on the flyer 80.

Note that although not shown in FIG. 4C, the shopping note 90 may further include opening hours of the store corresponding to the store name 81.

The check box 92 in FIG. 4C is one holding the state of the check box 92 displayed in the product list 39 (see FIG. 4B) as it is. A customer can delete the unnecessary shopping note by pressing the check box 92.

The shopping-note-registration-complete button 55 is a button for completing registration of the shopping note 90 displayed on the screen in the state U shown in FIG. 4C. When the shopping-note-registration-complete button 55 is pressed, the content of the shopping note 90 displayed on the screen is stored in the storage device 25 of the mobile terminal 10 as the shopping note data 28 (see FIG. 1). The shopping note data 28 includes, for each store code, the above-mentioned product code corresponding to the product name 84, the product name 84, the selling price 85, and the sales date 82. Note that in the case where the shopping note data 28 already contains product information of the same store code, newly registered product information is added to and contained in the shopping note of the store code that is already registered.

Further, in the case where product information of another store code is registered, the shopping note data 28 contains, as product information associated with a new store code, a product code, the product name 84, the selling price 85, and the sales date 82. That is, the shopping note data 28 is stored for each store (for each store code).

The return button 56 in FIG. 4C is a button for returning to the state T in FIG. 4B, i.e., the screen in which the product list 39 is displayed.

(Notification Function of Shopping Note)

Figure 5:
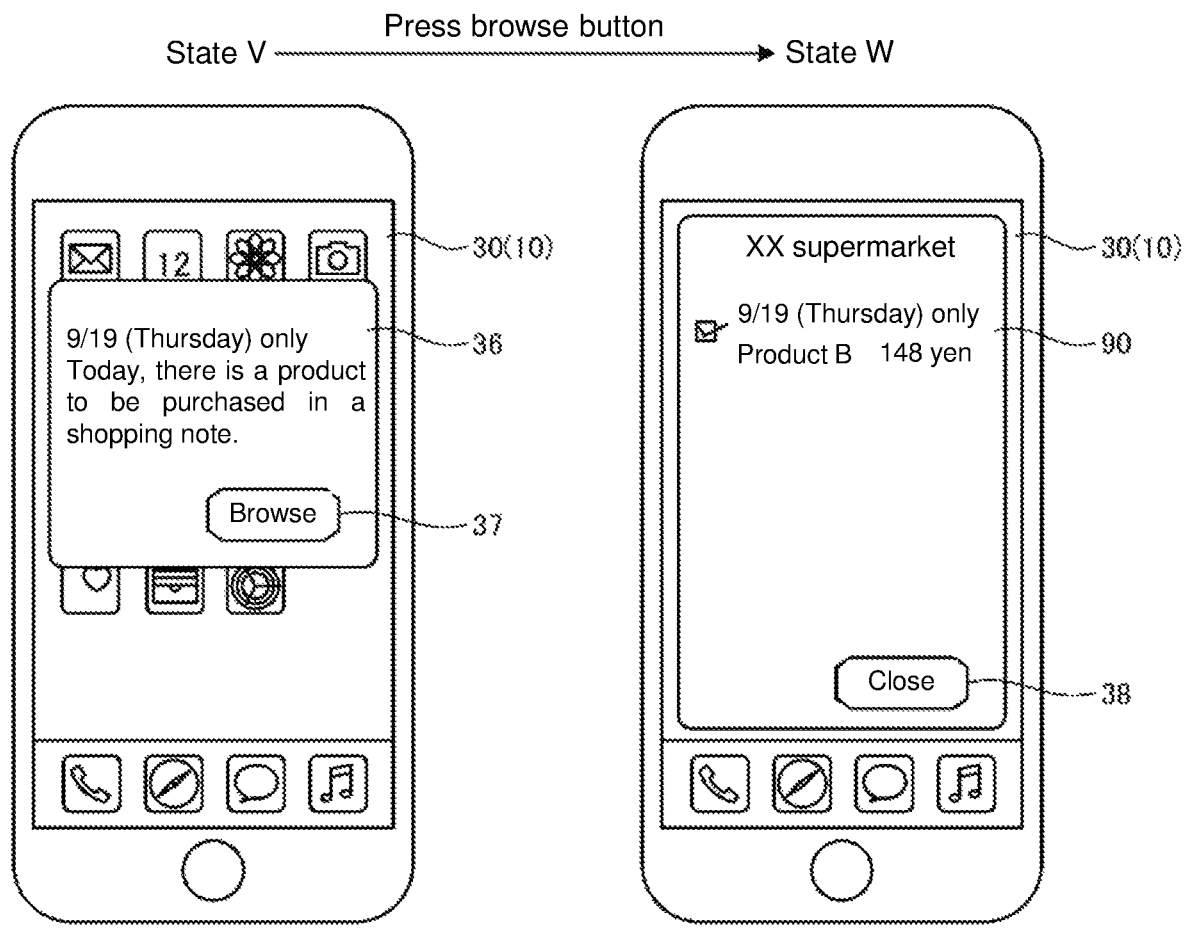
FIG. 5 is a diagram showing an example of a method of notifying that there is a shopping note in the mobile terminal according to the first embodiment.

A function of the mobile terminal 10 notifying, at predetermined timing, that a shopping note is registered will be described with reference to FIG. 5. FIG. 5 is a diagram showing an example of a method of notifying that there is a shopping note in the mobile terminal according to the first embodiment.

A state V shown in FIG. 5 shows an example in which a popup window 36 notifying that there is a product registered in a shopping note is displayed on the display device 30 of the mobile terminal 10. The popup window 36 is displayed at arbitrarily set timing, e.g., two days ago, one day ago, or on the day, with reference to the sales date of the product registered in the shopping note. The example shown in the state V is an example of notification on the day of the sales date.

A message indicating that there is a product registered in a shopping note and a browse button 37 are displayed on the popup window 36.

A customer can browse the registered shopping note 90 by pressing the browse button 37.

The state W shown in FIG. 5 shows an example of the shopping note 90 displayed when the browse button 37 is pressed. The registered content (a store name, a sales date, a product name, a selling price, and a check box) and a close button 38 are displayed in the shopping note 90.

The customer can close the displayed shopping note 90 by pressing the close button 38.

(Display Format of Shopping Note)

Figure 6:
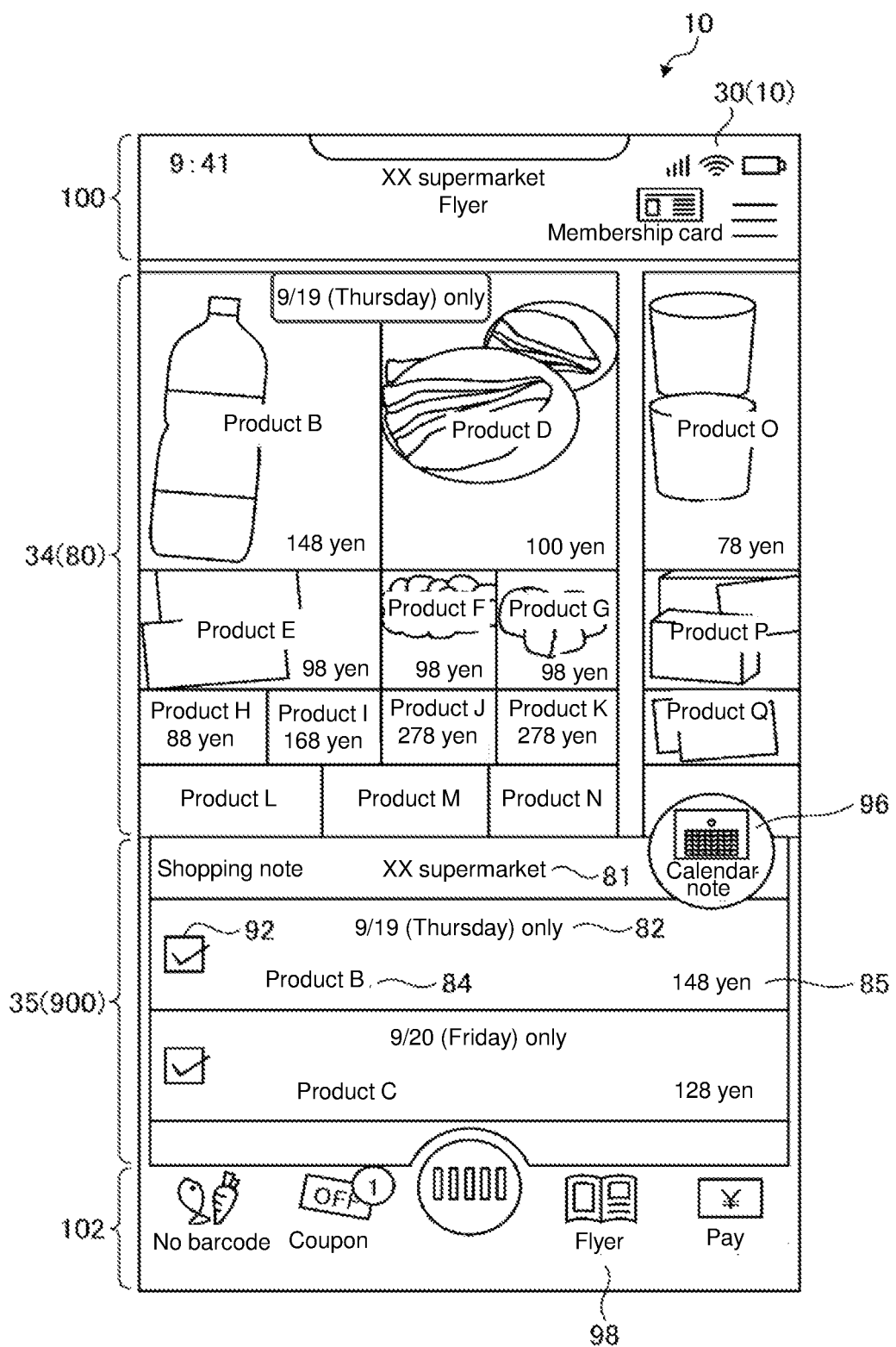
FIG. 6 is a diagram showing an example in which a shopping note generated by a mobile terminal 10 according to the first embodiment is displayed in a list format.
Figure 7A:
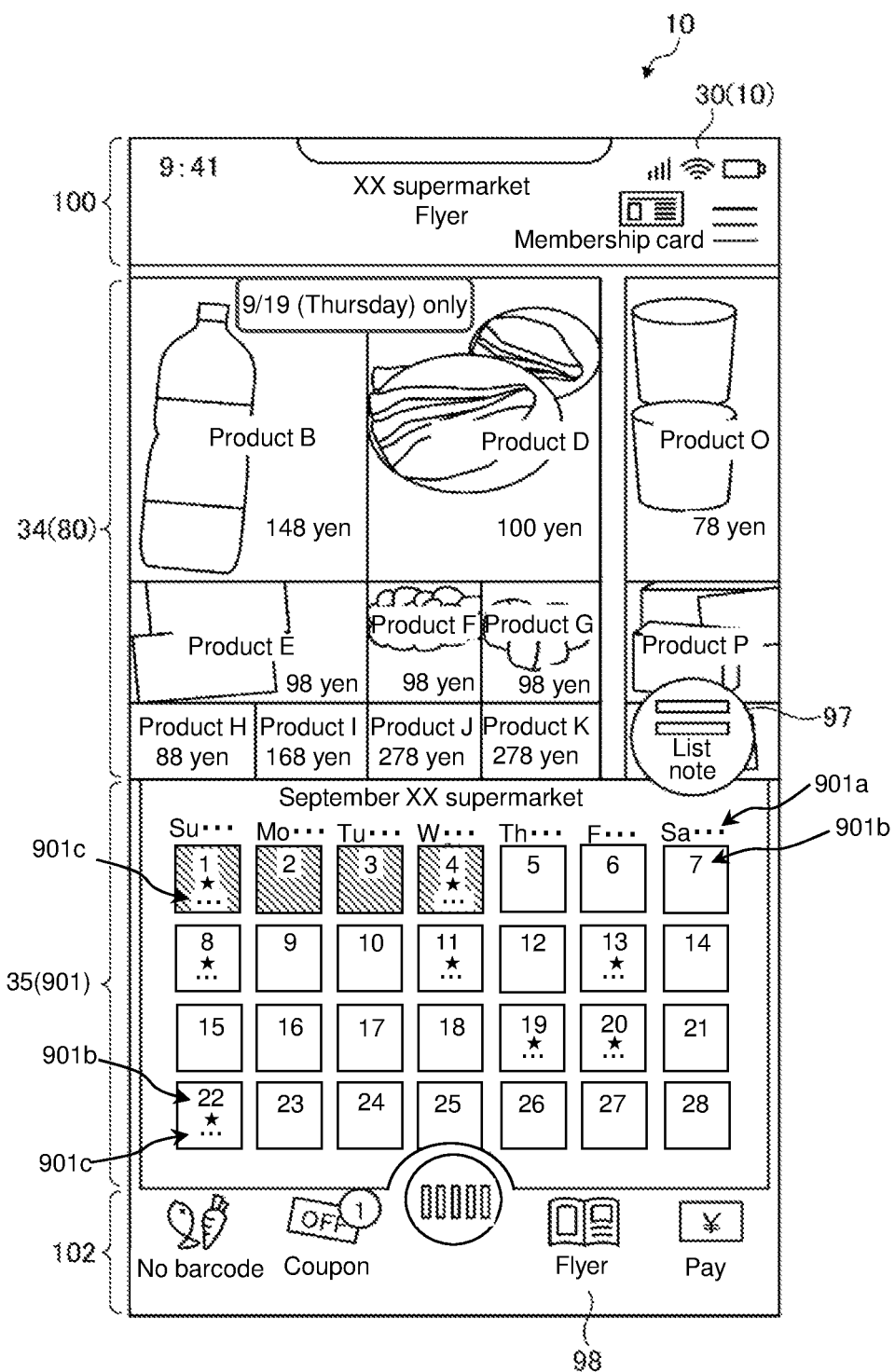
FIG. 7A is a diagram showing an example in which a shopping note generated by the mobile terminal 10 according to the first embodiment is displayed in a calendar format.
Figure 7B:
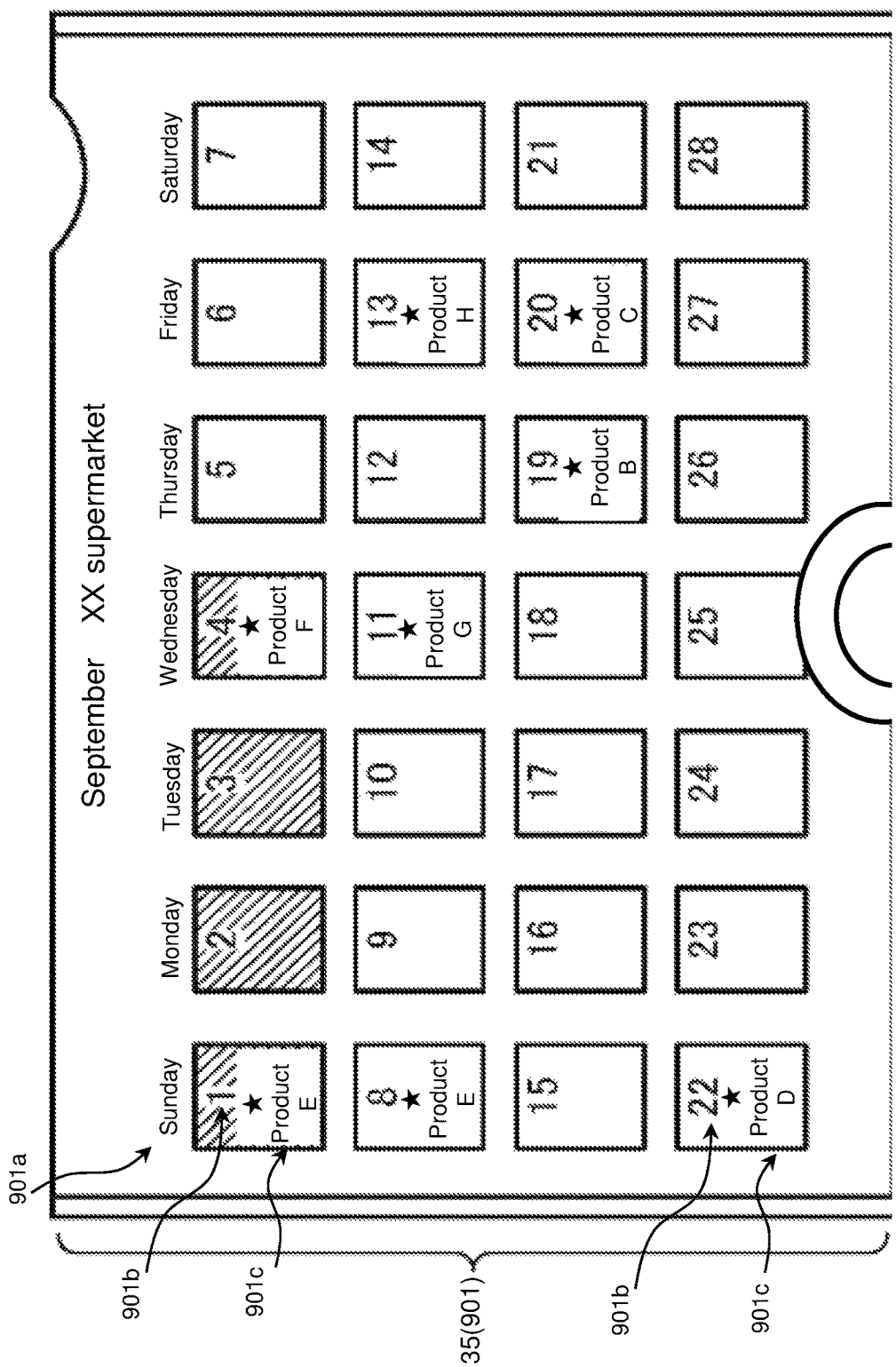
FIG. 7B is an enlarged view of the shopping note in the calendar format shown in FIG. 7A.

A display format of the shopping note 90 will be described with reference to FIG. 6, FIG. 7A, and FIG. 7B. FIG. 6 is a diagram showing an example in which a shopping note generated by the mobile terminal 10 is displayed in a list format. FIG. 7A is a diagram showing an example in which a shopping note generated by the mobile terminal 10 is displayed in a calendar format. FIG. 7B is an enlarged view of the shopping note in the calendar format shown in FIG. 7A.

The mobile terminal 10 displays the shopping note 90 in two different formats, i.e., a shopping note 900 in a list format and the shopping note 901 in a calendar format. As shown in FIG. 6, the shopping note 900 in the list format displays the registered product in a list format for each sales date. As shown in FIG. 7A and FIG. 7B, the shopping note 901 in the calendar format displays the registered product marked on a calendar. The customer can freely select the two display formats by using a display format change button 96 or 97 displayed on the display device 30.

As shown in FIG. 6, the shopping note 900 in the list format is displayed in the second display region 35 of the display device 30 and includes the store name 81, the sales date 82, the product name 84, the selling price 85, and the check box 92. The content of the respective items is as described above.

The display format change button 96 is further displayed on the display device 30. The customer can change the shopping note 900 in the list format to the shopping note 901 in the calendar format shown in FIG. 7A and FIG. 7B by pressing the display format change button 96.

Note that the flyer 80 is displayed in the first display region 34 of the display device 30. Further, header information is displayed in a header region 100 at the top of the display device 30. Footer information is displayed in a footer region 102 at the bottom of the display device 30. The header information includes information such as a store name. The footer information includes various operation buttons such as a flyer display button 98 to be pressed when the flyer 80 is displayed.

As shown in FIG. 7A and FIG. 7B, the shopping note 901 in the calendar format is displayed in the second display region 35 of the display device 30. A product name 901*c* of the registered product is displayed at a position representing a sales date (date 901*b*) of the calendar. Note that a reference symbol 901*a* in FIG. 7A and FIG. 7B indicates the day of the week. Further, as shown in FIG. 7A and FIG. 7B, the date in the past is hatched. The note of the product that has been registered in the shopping note 90 but has not been actually bought is kept without deleting. As a result, in the case where the same product is listed again on the flyer 80, the current price can be compared with the past price.

The display format change button 97 is further displayed on the display device 30. The customer can change the shopping note 901 in the calendar format to the shopping note 900 in the list format shown in FIG. 6 by pressing the display format change button 97.

Note that the points where the flyer 80 is displayed in the first display region of the display device 30, header information is displayed in the header region 100 at the top of the display device 30, and footer information is displayed in the footer region 102 at the bottom of the display device 30 are the same as those in FIG. 6

(Functional Configuration of Mobile Terminal)

Figure 8:
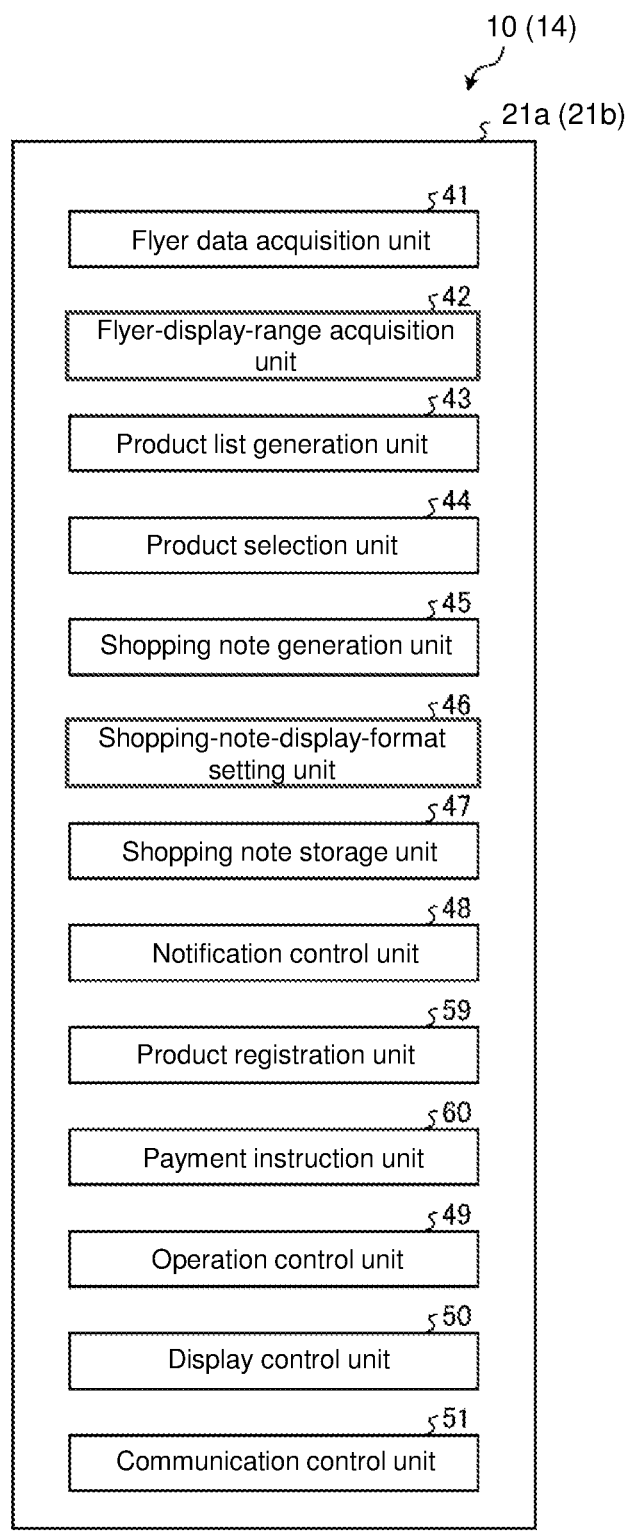
FIG. 8 is a functional block diagram showing an example of a functional configuration of the mobile terminal according to the first embodiment.

A functional configuration of the mobile terminal 10 will be described with reference to FIG. 8. FIG. 8 is a functional block diagram showing an example of a functional configuration of the mobile terminal according to the first embodiment.

The controller 21a of the mobile terminal 10 develops the control program 26 into the RAM 24 to cause the mobile terminal 10 to operate as functional units, i.e., a flyer data acquisition unit 41, a flyer-display-range acquisition unit 42, a product list generation unit 43, a product selection unit 44, a shopping note generation unit 45, a shopping-note-display-format setting unit 46, a shopping note storage unit 47, a notification control unit 48, a product registration unit 59, a payment instruction unit 60, an operation control unit 49, a display control unit 50, and a communication control unit 51 shown in FIG. 8. Note that part or all of these functions may be realized by dedicated hardware.

The flyer data acquisition unit 41 acquires the flyer data 27 from a server apparatus (not shown). Further, the flyer data acquisition unit 41 displays, on the display device 30, the flyer 80 included in the acquired flyer data 27.

The flyer-display-range acquisition unit 42 acquires information relating to the display range of the flyer 80 displayed in the first display region 34 of the display device 30 (display unit).

The product list generation unit 43 generates the product list 39 including at least a product name, a selling price, and a sales date of a product included in the flyer 80 displayed in the first display region 34 of the display device 30 (display unit). Further, the product list generation unit 43 displays the generated the product list 39 in the second display region 35 of the display device 30.

The product selection unit 44 causes a customer to select a product from the product list 39.

The shopping note generation unit 45 determines whether or not there is an instruction to register the shopping note 90 for the product list 39 from which a product has been selected. Further, the shopping note generation unit 45 generates the shopping note 90 in which the product name 84, the selling price 85, and the sales date 82 of the product selected by the product selection unit 44 are associated with each other. Note that in the case where the shopping note 90 in the same store is already generated, the shopping note generation unit 45 updates the shopping note 90 that is already generated. Further, the shopping note generation unit 45 displays the generated shopping note 90 on the display device 30.

The shopping-note-display-format setting unit 46 sets the display format of the shopping note 90 to one of the shopping note 900 in the list format and the shopping note 901 in the calendar format.

The shopping note storage unit 47 stores, as the shopping note data 28, the shopping note 90 in the storage device 25 under the condition of acquiring operation information indicating the registration completion of the shopping note 90. Note that the shopping note storage unit 47 stores the shopping note 90 for each store corresponding to the flyer 80, the shopping note 90 being generated on the basis of the flyer 80.

The notification control unit 48 displays, on the display device 30 (display unit), at least that there is a product to be purchased, under the condition that the sales date included in the shopping note 90 and the current date match.

The product registration unit 59 causes the camera 20 included in the customer's mobile terminal 10 to read the product code attached to a product to be purchased. Further, the product registration unit 59 transmits the read product code to a server apparatus (not shown) together with a transaction code and a customer code.

The payment instruction unit 60 causes an adjustment apparatus such as a POS terminal to perform account processing and payment processing. Note that the mobile terminal 10 itself may perform account processing and payment processing.

The operation control unit 49 acquires information regarding a customer's operation of the mobile terminal 10. Further, the controller 21a performs control corresponding to the acquired operation information, as the operation control unit 49.

The display control unit 50 displays various types of image information on the display device 30, as the function unit of the controller 21a.

The communication control unit 51 controls communication with a server apparatus (not shown).

(Flow of Processing Performed by Mobile Terminal)

Figure 9:
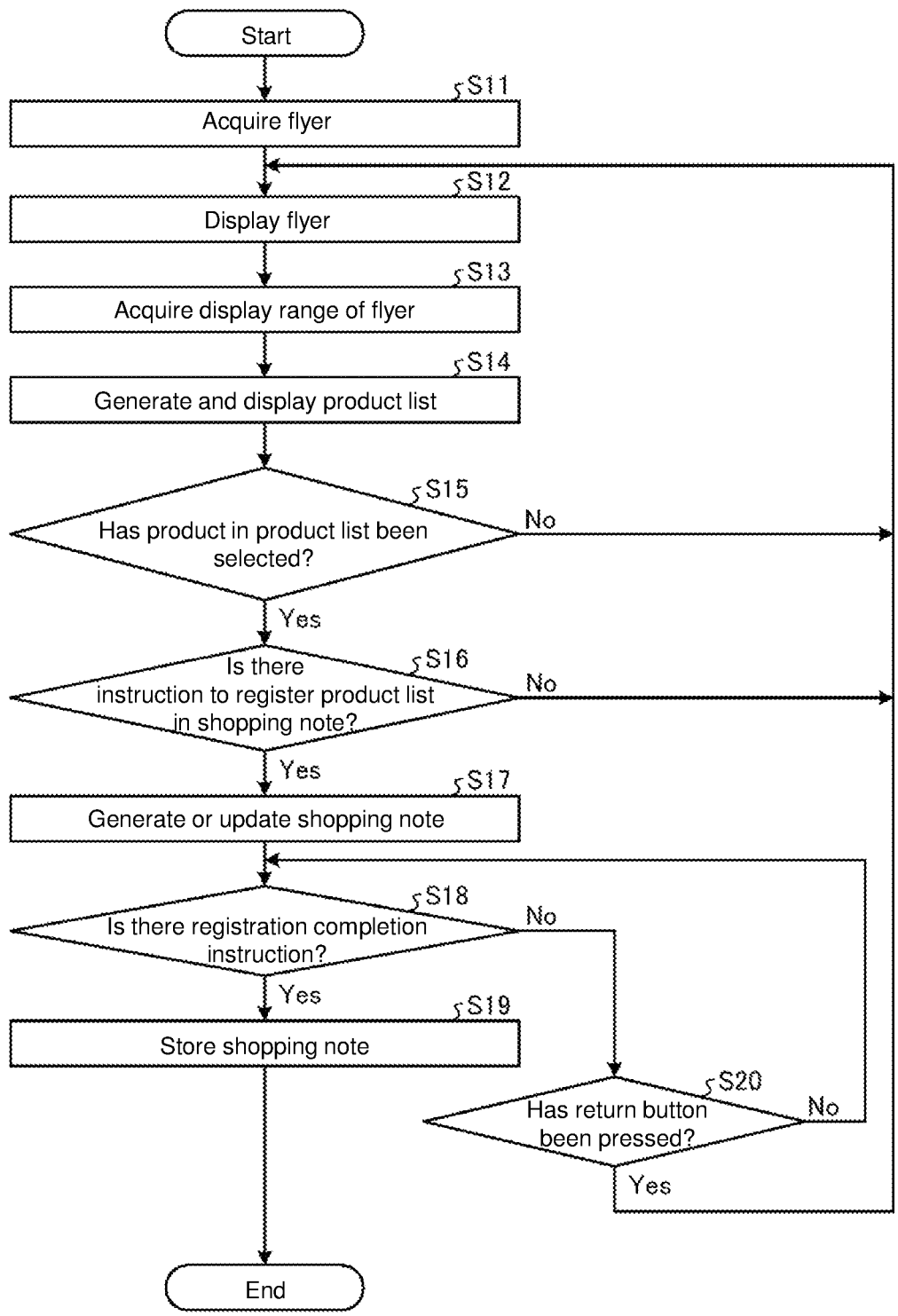
FIG. 9 is a flowchart showing an example of processing performed by the mobile terminal according to the first embodiment.

Processing performed by the mobile terminal 10 will be described with reference to FIG. 9. FIG. 9 is a flowchart showing an example of processing performed by the mobile terminal according to the first embodiment.

In Step S11, the flyer data acquisition unit 41 of the controller 21a acquires the flyer data 27 from a server apparatus (not shown) by the operation of the communication control unit 51.

In Step S12, the flyer data acquisition unit 41 of the controller 21a displays, in the first display region 34 of the display device 30, the flyer 80 included in the acquired flyer data 27.

In Step S13, the flyer-display-range acquisition unit 42 of the controller 21a acquires information relating to the display range of the flyer 80 displayed in the first display region 34 of the display device 30 (display unit). The information relating to the display range of the flyer 80 includes, for example, the coordinate values on the upper left side and the coordinate values on the lower left side of the flyer 80 displayed in the first display region 34.

In Step S14, the product list generation unit 43 of the controller 21a generates, on the basis of the information relating to the display range of the flyer 80 acquired by the flyer-display-range acquisition unit 42, the product list 39 of the product included in the flyer 80 displayed in the first display region 34. Further, the product list generation unit 43 displays the generated product list 39 in the second display region 35. Note that the processing from Step S12 to Step S14 is repeated in accordance with the browsing state (enlarging/reducing or scrolling) of the flyer 80 by a customer. The content of the product list 39 displayed on the display device 30 changes depending on the browsing state of the flyer 80 by a customer.

In Step S15, the product selection unit 44 of the controller 21a determines whether or not a product in the product list 39 has been selected. In the case where it is determined that a product in the product list 39 has been selected (Step S15: Yes), the processing of the controller 21a proceeds to Step S16. Meanwhile, in the case where it is determined that a product in the product list 39 has not been selected (Step S15: No), the processing of the controller 21a returns to Step S12.

In Step S16, the shopping note generation unit 45 of the controller 21a determines whether or not there is an instruction to register, in the shopping note 90, the product list 39 from which a product has been selected. In the case where it is determined that there is an instruction to register, in the shopping note 90, the product list 39 from which a product has been selected (Step S16: Yes), the processing of the controller 21a proceeds to Step S17. Meanwhile, in the case where it is determined that there is no instruction to register, in the shopping note 90, the product list 39 from which a product has been selected (Step S16: No), the processing of the controller 21a returns to Step S12.

In Step S17, the shopping note generation unit 45 of the controller 21a generates or updates the shopping note 90.

In Step S18, the operation control unit 49 determines that whether or not there is a registration completion instruction of the shopping note 90. In the case where there is a registration completion instruction of the shopping note 90 (Step S18: Yes), the processing of the controller 21a proceeds to Step S19. Meanwhile, in the case where there is no registration completion instruction of the shopping note 90 (Step S18: No), the processing of the controller 21a proceeds to Step S20. Note that the fact that there is a registration completion instruction of the shopping note 90 is determined by the fact that the shopping-note-registration-complete button 55 (see FIG. 4C) is pressed.

In Step S19, the shopping note storage unit 47 of the controller 21a stores the shopping note 90 in the storage device 25. After that, the controller 21a of the mobile terminal 10 ends the processing shown in FIG. 9.

In Step S20, the operation control unit 49 of the controller 21a determines whether or not the return button 56 (see FIG. 4C) has been pressed. In the case where it is determined that the return button 56 has been pressed (Step S20: Yes), the processing of the controller 21a returns to Step S12. Meanwhile, in the case where it is determined that the return button 56 has not been pressed (Step S20: No), the processing of the controller 21a returns to Step S18.

(Operation and Effect in First Embodiment)

As described above, the controller 21a (product list generation unit 43) of the mobile terminal 10 (information processing apparatus) according to this embodiment generates the product list 39. The product list 39 includes at least the product name 84, the selling price 85, and the sales date 82 of a product included in the flyer 80 displayed in the first display region 34 of the display device 30 (display unit). The controller 21a (product list generation unit 43) displays the generated product list 39 in the second display region 35 of the display device 30. Further, the controller 21a (product selection unit 44) causes an operator (customer) to select a product from the product list 39. Further, the controller 21a (shopping note generation unit 45) generates the shopping note 90 in which the product name 84, the selling price 85, and the sales date 82 of the selected product are associated with each other. The controller 21a (shopping note generation unit 45) displays the generated shopping note 90 on the display device 30. Further, the controller 21a (storage unit 47) stores the shopping note 90 in the storage device 25. Therefore, it is possible to easily generate the shopping note 90 while browsing the flyer 80.

Further, in the mobile terminal 10 (information processing apparatus) according to this embodiment, the controller 21a (product list generation unit 43) generates the product list 39 of the product displayed in the first display region 34, of the product included in the flyer 80, as described above. Therefore, it is possible to easily select a product that a customer wants or a notable product from the flyer 80 and improve the operability.

Further, in the mobile terminal 10 (information processing apparatus) according to this embodiment, the controller 21a (the notification control unit 48) displays, on the display device 30 (display unit), at least that there is a product to be purchased, under the condition that the sales date 82 included in the shopping note 90 and the current date match. Therefore, it is possible to prevent a customer from forgetting to buy a product that he/she wants or a notable product.

Further, in the mobile terminal 10 (information processing apparatus) according to this embodiment, the controller 21a (shopping note storage unit 47) stores the shopping note 90 for each store corresponding to the flyer 80, the shopping note 90 being generated on the basis of the flyer 80. Therefore, it is possible to prevent, when shopping on the basis of the registered content of the shopping note 90, a customer from forgetting to buy.

Further, in the mobile terminal 10 (information processing apparatus) according to this embodiment, the controller 21a (shopping note generation unit 45) displays the shopping note 90 in a list format or in a calendar format (the shopping note 900 in the list format or the shopping note 901 in the calendar format). Therefore, a customer can check the shopping note 90 in a format that fits the customer's purpose.

Second Embodiment

An embodiment in which an information processing apparatus according to this embodiment is applied to a shopping support system 11 will be described with reference to the drawings.

Figure 10:
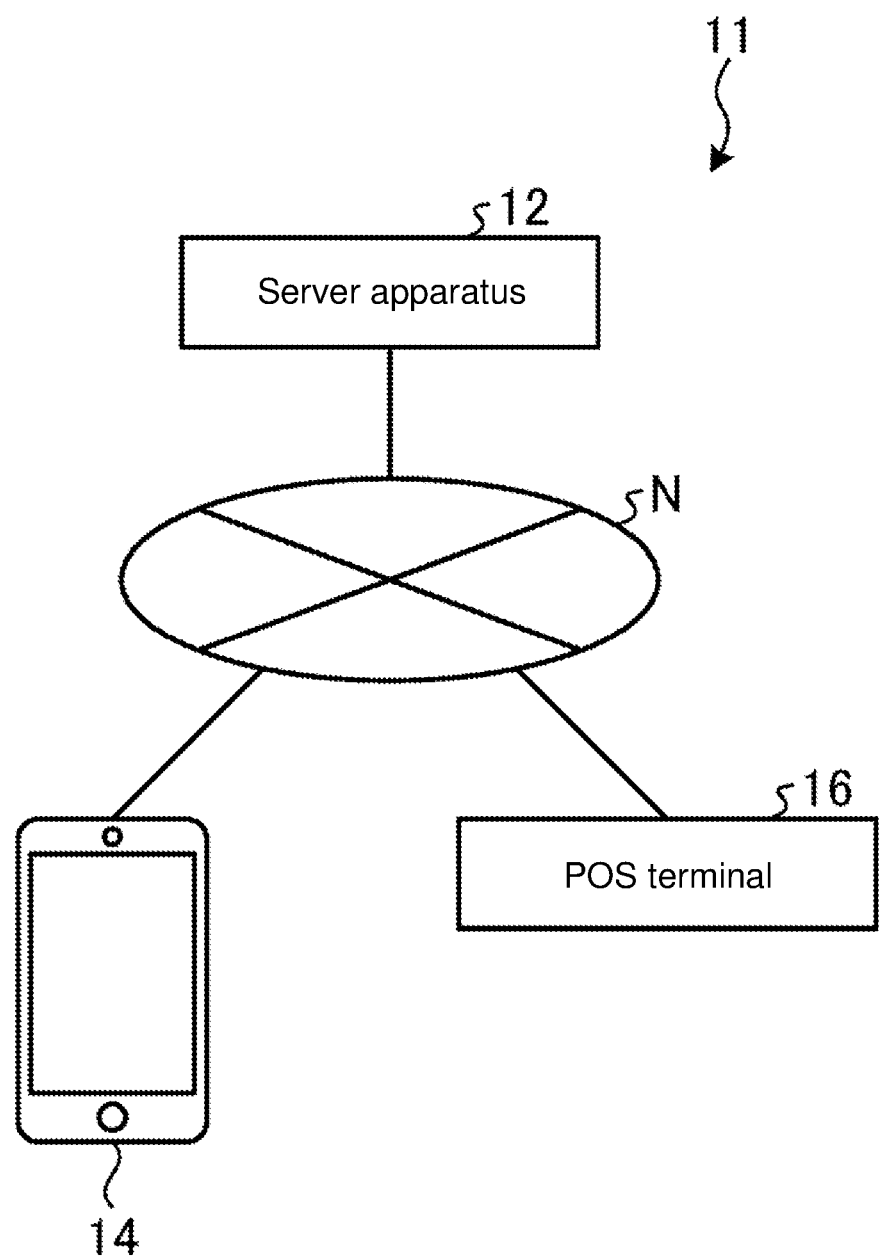
FIG. 10 is a block diagram showing an example of a schematic configuration of a shopping support system according to a second embodiment.

A system configuration of the shopping support system 11 will be described with reference to FIG. 10. FIG. 10 is a block diagram showing an example of a schematic configuration of a shopping support system according to a second embodiment.

The shopping support system 11 acquires the stock quantity of a product registered in the shopping note 90 by a customer and additionally registers the acquired stock quantity in the shopping note 90. Further, the shopping support system 11 deletes, in the case where the customer has purchased the product registered in the shopping note 90, registration information relating to the product from the shopping note 90.

In the shopping support system 11, a server apparatus 12, a mobile terminal 14, and a POS terminal (payment terminal) 16 are communicably connected to each other via a network N.

The server apparatus 12 controls the operation of the entire shopping support system 11. Note that the server apparatus 12 is an example of an information processing apparatus according to the present disclosure.

The mobile terminal 14 has a function of communicating with the server apparatus 12 in addition to the function of the mobile terminal 10 described in the first embodiment.

The POS terminal 16 is a terminal apparatus that is installed in a store and performs registration, accounting, and payment of a product purchased by a customer. Specifically, the POS terminal 16 reads an accounting code relating to a purchased product registered by the customer, which is displayed on the mobile terminal 14. The accounting code includes a transaction code, and the POS terminal 16 acquires, from the server apparatus 12, transaction information associated with the accounting code (transaction code). The POS terminal 16 performs payment processing relating to the acquired transaction information and outputs payment completion information to the server apparatus 12. Further, the POS terminal 16 outputs stock information of a product to the server apparatus 12. Note that the shopping support system 11 may include, in addition to the POS terminal 16, a store server that communicates with a plurality of POS terminals 16 and controls the operations of the plurality of POS terminals 16.

The server apparatus 12 receives, from the mobile terminal 14, the shopping note 90 registered by a customer.

Further, the server apparatus 12 acquires, from the POS terminal 16, the stock quantity of a product registered in the shopping note 90 by the customer. Further, the server apparatus 12 receives, when the customer performs payment by the POS terminal 16, identification information for identifying the customer and product information of the purchased product.

The server apparatus 12 further edits the acquired shopping note 90. Specifically, the server apparatus 12 adds, to the acquired shopping note 90, the stock quantity of the product registered in the shopping note 90. Further, the server apparatus 12 deletes, in the case where the customer has purchased a product registered in the shopping note 90, information relating to the product from the acquired shopping note 90. The server apparatus 12 outputs the edited shopping note 90 to the mobile terminal 14 such that the shopping note 90 can be browsed.

(Hardware Configuration of Server Apparatus)

Figure 11:
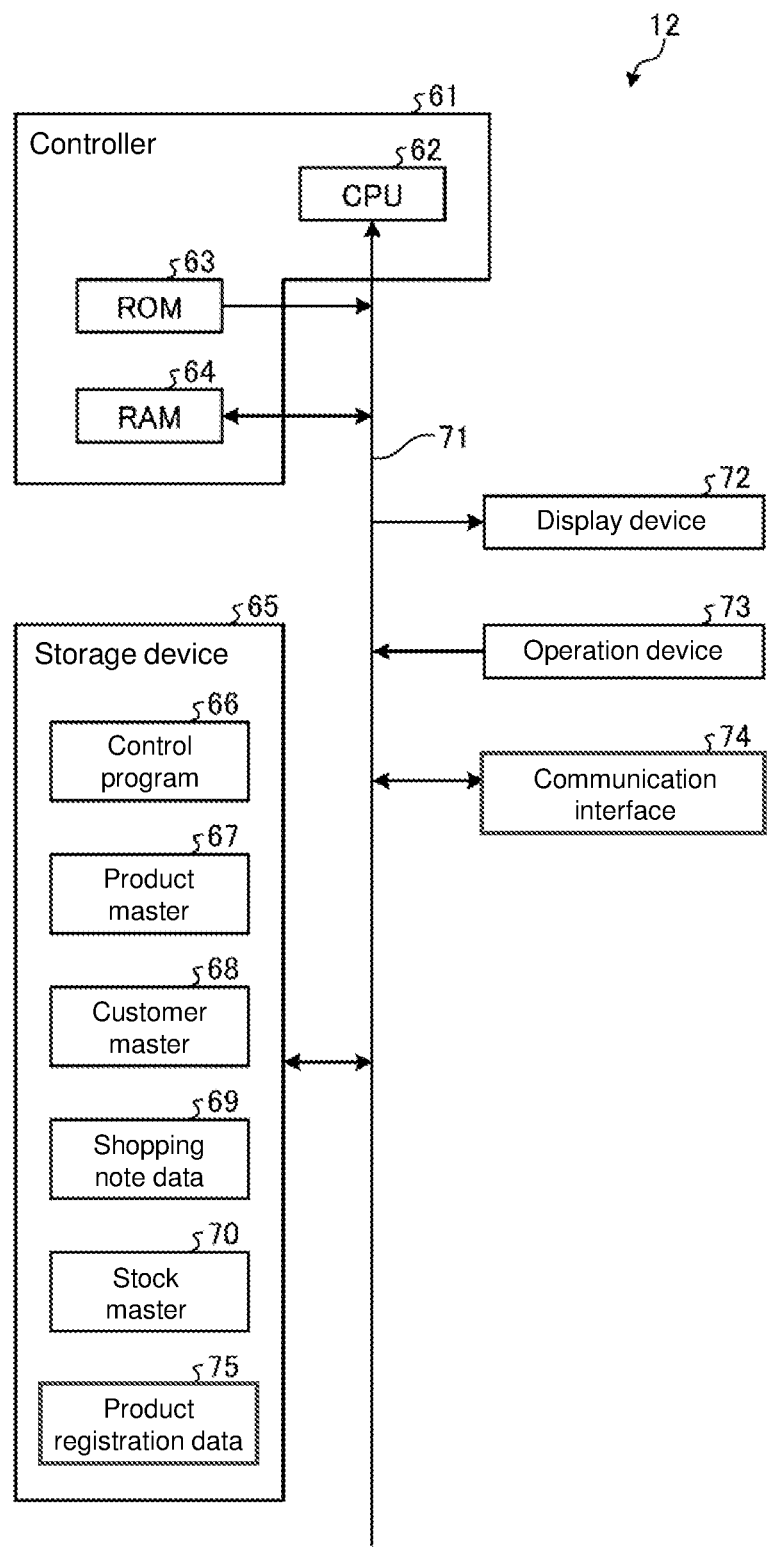
FIG. 11 is a block diagram showing an example of a hardware configuration of a server apparatus included in the shopping support system according to the second embodiment.

A hardware configuration of the server apparatus 12 will be described with reference to FIG. 11. FIG. 11 is a block diagram showing an example of a hardware configuration of a server apparatus included in the shopping support system according to the second embodiment.

The server apparatus 12 includes a controller 61 for controlling the respective units of the server apparatus 12. The controller 61 includes a processor and a memory. The processor includes a CPU 62. The memory includes a ROM 63 and a RAM 64. The CPU 62 is connected to the ROM 63 and the RAM 64 via an internal bus 71 such as an address bus and a data bus. The CPU 62 develops various programs stored in the ROM 63 or a storage device 65 into the RAM 64. The CPU 62 operates in accordance with the various programs developed into the RAM 64 to control the server apparatus 12. That is, the controller 61 has a configuration of a general computer.

The controller 61 is connected to the storage device 65, a display device 72, an operation device 73, and a communication interface 74 via the internal bus 71.

The storage device 65 is a storage device such as an HDD and an SSD. Further, the storage device 65 may be a non-volatile memory such as a flash memory in which stored information is retained even when the power source is turned off. The storage device 65 stores a control program 66, a product master 67, a customer master 68, shopping note data 69, a stock master 70, and product registration data 75.

The control program 66 is a program for controlling the operation of the entire server apparatus 12.

The product master 67 is a master file for storing attribute information of a product sold in the shopping support system 11 in association with a product code of the product. Note that a specific structure of the product master 67 will be described below in detail (see FIG. 12).

The customer master 68 is a master file for storing attribute information of a customer using the shopping support system 11 in association with a customer code of the customer. Note that a specific structure of the customer master 68 will be described below in detail (see FIG. 13).

The shopping note data 69 is a file for storing, in association with a customer code for uniquely specifying a customer, information of the shopping note generated by the customer corresponding to the customer code and stock information of the product registered in the shopping note, for each store code. Note that a specific structure of the shopping note data 69 will be described below in detail (see FIG. 14).

The stock master 70 is a master file for storing stock information of a product sold in the shopping support system 11 in association with a product code of the product. The server apparatus 12 communicates with the POS terminal 16 as needed to acquire the stock quantity of the product and updates the content of the stock master 70. Note that a specific structure of the stock master 70 will be described below in detail (see FIG. 15).

The product registration data 75 stores transaction information indicating the content of a transaction in association with a transaction code for uniquely specifying a product transaction. Details of the product registration data 75 will be described below (see FIG. 16).

The display device 72 displays a screen generated by an instruction of the controller 61. The display device 72 includes, for example, a device such as an LCD and an organic EL device.

The operation device 73 acquires an operator's input operation and outputs it to the controller 61. The operation device 73 includes, for example, a device such as a touch panel and a keyboard.

The communication interface 74 is an interface for communicating with the POS terminal 16 and the mobile terminal 14 via wireless communication by a wireless LAN or the like or wired communication by a wired LAN or the like.

Note that since the hardware configuration of the mobile terminal 14 is the same as the hardware configuration of the mobile terminal 10 (see FIG. 1) described in the first embodiment, description thereof is omitted. However, the storage device 25 of the mobile terminal 14 stores the shopping note data 69 (see FIG. 14) instead of the shopping note data 28 described in FIG. 1.

Further, in the shopping support system 11, the POS terminal 16 is a terminal apparatus that transmits, to the server apparatus 12, payment completion information indicating that a customer has purchased a product and stock information of a product sold in a store, and does not have a special hardware configuration. For this reason, description of the hardware configuration of the POS terminal 16 is omitted.

(Data Structures of Various Types of Data)

Data structures of various types of data stored in the storage device 65 will be described with reference to FIG. 12, FIG. 13, FIG. 14, FIG. 15, and FIG. 16. FIG. 12 is a diagram showing an example of a data structure of a product master. FIG. 13 is a diagram showing an example of a data structure of a customer master. FIG. 14 is a diagram showing an example of a data structure of shopping note data. FIG. 15 is a diagram showing an example of a data structure of a stock master. FIG. 16 is a diagram showing an example of a data structure of product registration data.

As shown in FIG. 12, the product master 67 stores a product code for uniquely specifying a product in association with a product name, a product type, and a selling price, each of which is product information of each product.

As shown in FIG. 13, the customer master 68 stores a customer code for uniquely specifying a customer in association with a name, an age, a gender, contact information, and a purchase history, each of which is customer information indicating the attribute of the customer. Note that the contact information is, for example, an e-mail address of the mobile terminal 14.

As shown in FIG. 14, the shopping note data 69 stores, in association with a customer code, shopping note information indicating the content of a shopping note generated by the mobile terminal 14 by the customer corresponding to the customer code. The shopping note information includes a store code, a generation date and time of a shopping note, an updated date and time of the shopping note, and a product code, a product name, a selling price, a sales date, and a stock quantity registered in the shopping note. Note that the shopping note data 69 is different from the shopping note data 28 described in the first embodiment in that shopping notes of an unspecified number of customers using the shopping support system 11 are stored for each customer code. That is, the shopping note data 69 stores a customer code. Further, the shopping note data 69 further stores the generation date and time, the updated date and time, and the stock quantity in addition to the content of the shopping note data 28.

The shopping note data 69 is updated every time the server apparatus 12 receives a new shopping note 90 from the mobile terminal 14. Further the shopping note data 69 is updated when the server apparatus 12 receives, from the POS terminal 16, payment completion information indicating that a customer has purchased the product registered in the shopping note 90. Further, the shopping note data 69 is updated every time the stock quantity of the product registered in the shopping note 90, which is received from the POS terminal 16 by the server apparatus 12, is updated. Every time the shopping note data 69 is updated, the updated date and time is changed.

As shown in FIG. 15, the stock master 70 stores a product code for uniquely specifying a product in association with a product name of the product, a store code of a store selling the product, a stock check date and time in each store, and a stock quantity in each store. The stock master 70 is updated every time the server apparatus 12 receives stock information from the POS terminal 16.

As shown in FIG. 16, the product registration data 75 stores transaction information in association with a transaction code for uniquely specifying a product transaction. The transaction information includes, for example, a customer code for specifying a customer who has purchased a product and a product code for specifying the purchased product.

(Functional Configuration of Server Apparatus)

Figure 17:
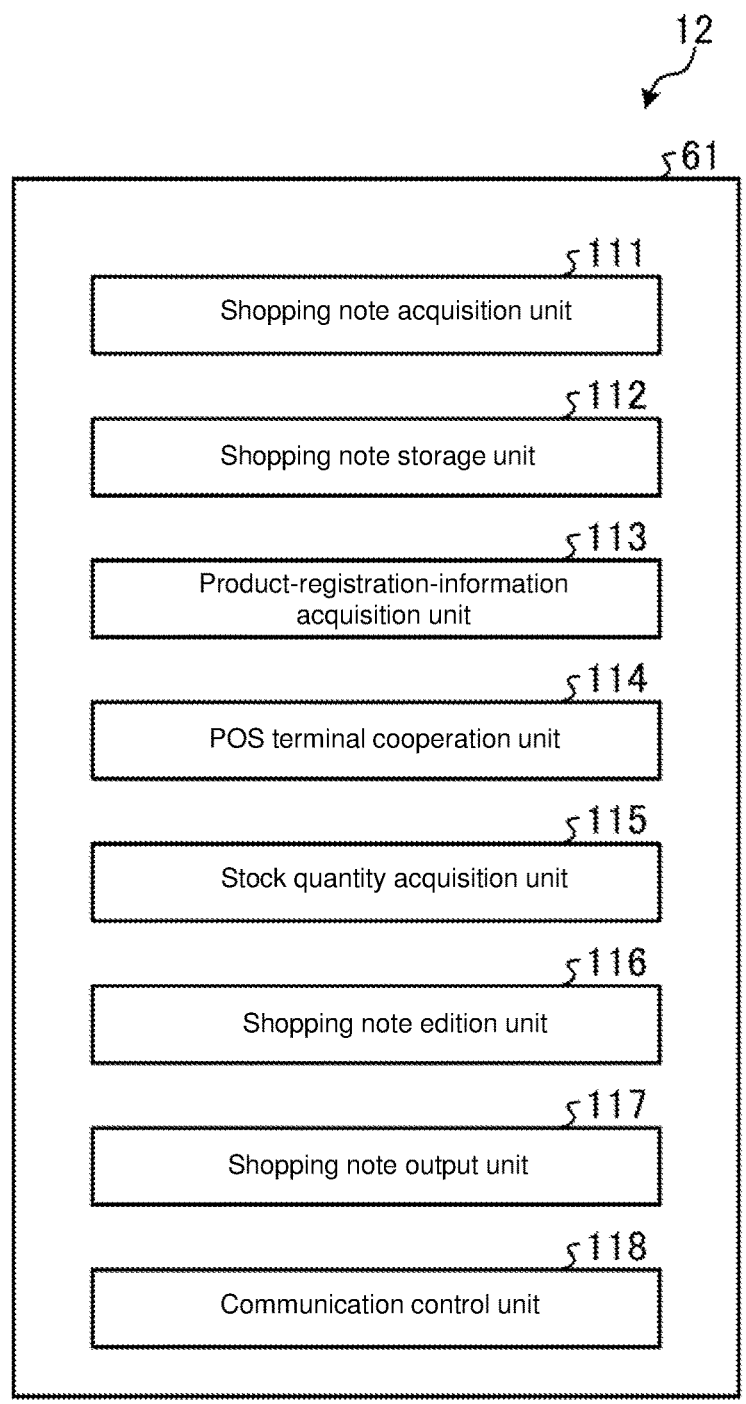
FIG. 17 is a block diagram showing an example of a functional configuration of the server apparatus included in the shopping support system according to the second embodiment.

A functional configuration of the server apparatus 12 included in the shopping support system 11 will be described with reference to FIG. 17. FIG. 17 is a functional block diagram showing an example of a functional configuration of the server apparatus included in the shopping support system according to the second embodiment.

The controller 61 of the server apparatus 12 develops the control program 66 into the RAM 64 to cause the server apparatus 12 to operate as functional units, i.e., a shopping note acquisition unit 111, a shopping note storage unit 112, a product-registration-information acquisition unit 113, a POS terminal cooperation unit 114, a stock quantity acquisition unit 115, a shopping note edition unit 116, a shopping note output unit 117, and a communication control unit 118 shown in FIG. 17. Note that part or all of these functions may be realized by dedicated hardware.

The shopping note acquisition unit 111 acquires the generated shopping note 90 from the mobile terminal 14.

The shopping note storage unit 112 stores, in the storage device 65, the shopping note 90 acquired by the shopping note acquisition unit 111.

The product-registration-information acquisition unit 113 acquires, from the mobile terminal 14, product registration information indicating that a product has been registered. Further, the product-registration-information acquisition unit 113 determines whether or not a product purchased by a customer is registered in the shopping note data 69.

The POS terminal cooperation unit 114 communicates with the POS terminal 16 to perform processing relating to payment of the purchased product. Specifically, the POS terminal cooperation unit 114 acquires a transmission request of product registration information from the POS terminal 16. Further, the POS terminal cooperation unit 114 outputs the requested product registration information to the POS terminal 16. Further, the POS terminal cooperation unit 114 acquires, from the POS terminal 16, payment completion information indicating that payment has been completed.

The stock quantity acquisition unit 115 acquires, from the POS terminal 16, the stock quantity of a product registered in the shopping note 90.

The shopping note edition unit 116 deletes, in the case where a customer has purchased a product registered in the shopping note 90, the registered information relating to the product from the shopping note 90, on the basis of the product registration information acquired by the product-registration-information acquisition unit 113 and the payment completion information acquired by the POS terminal 16. Further, the shopping note edition unit 116 adds, on the basis of the stock quantity of the product acquired by the stock quantity acquisition unit 115, the stock quantity of the registered product to the shopping note 90. Note that the updated date and time stored in the shopping note data 69 is updated every time the shopping note edition unit 116 edits the shopping note 90. Further, the stock quantity stored in the shopping note data 69 is updated every time the shopping note edition unit 116 adds the stock quantity of a product.

The shopping note output unit 117 outputs, to the mobile terminal 14, the shopping note 90 edited by the shopping note edition unit 116.

The communication control unit 118 controls communication between the server apparatus 12 and the POS terminal 16.

(Functional Configuration of Mobile Terminal)

The functional configuration of the mobile terminal 14 included in the shopping support system 11 includes a shopping note output unit and a shopping note acquisition unit (not shown) in addition to the functional configuration of the mobile terminal 10 (see FIG. 8) described in the first embodiment.

The shopping note output unit of the mobile terminal 14 outputs, to the server apparatus 12, the shopping note 90 generated by the mobile terminal 14.

The shopping note acquisition unit of the mobile terminal 14 acquires, from the server apparatus 12, the shopping note 90 edited by the server apparatus 12.

(Functional Configuration of POS Terminal)

The POS terminal 16 included in the shopping support system 11 includes a payment-completion-information output unit and a product-stock-quantity output unit (not shown) in addition to the function of a general POS terminal that performs registration, accounting, and payment of a product purchased by a customer.

The payment-completion-information output unit of the POS terminal 16 outputs, when payment is completed, payment completion information indicating that payment has been completed to the server apparatus 12.

The product-stock-quantity output unit of the POS terminal 16 outputs the stock quantity of a product to the server apparatus 12 at predetermined timing.

(Description of Shopping Note Editing Processing)

Shopping note editing processing performed by the server apparatus 12 will be described with reference to FIG. 18.

Figure 18:
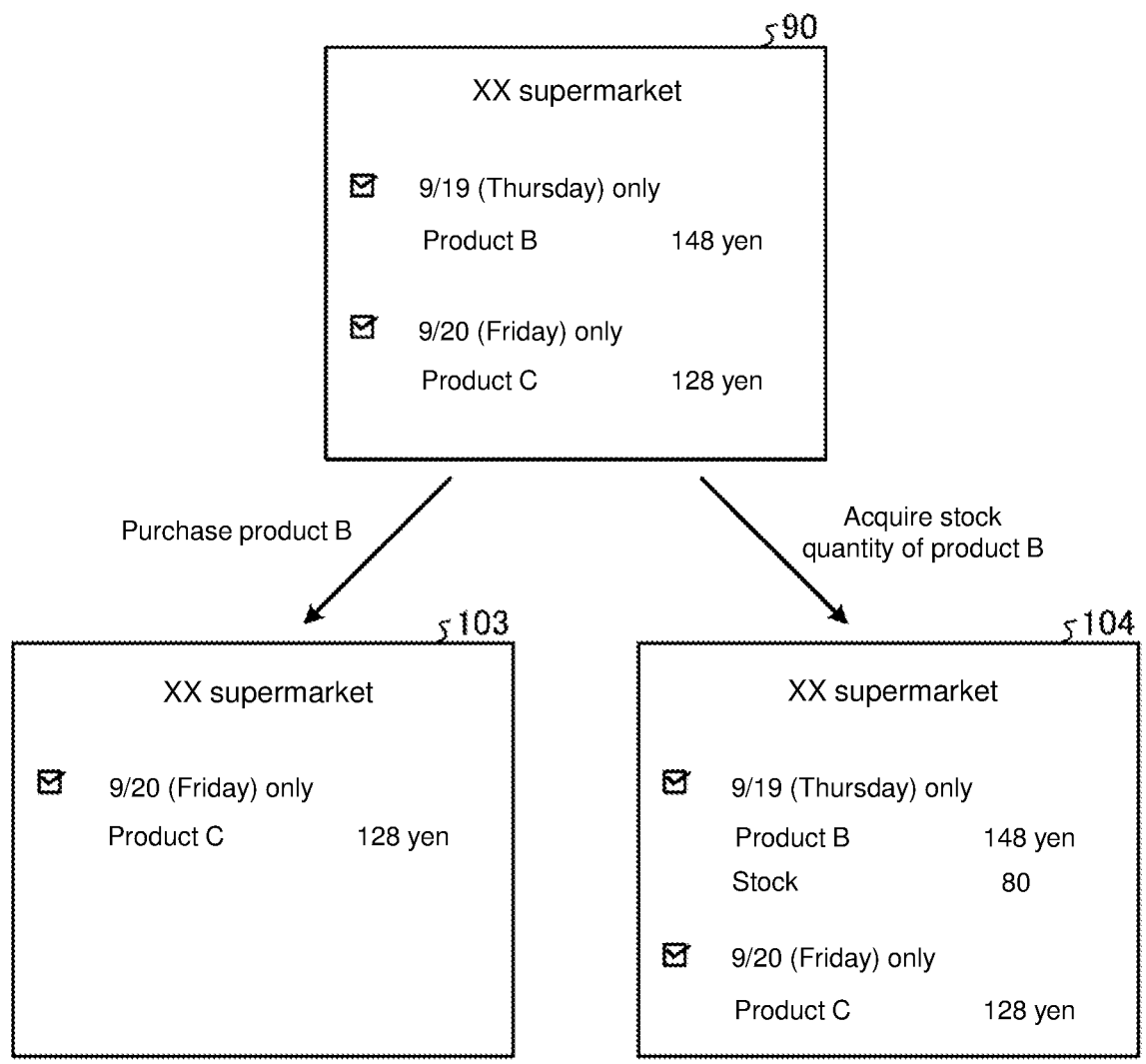
FIG. 18 is a diagram showing an example of processing content of shopping note editing processing performed by the server apparatus according to the second embodiment.

FIG. 18 is a diagram showing an example of processing content of shopping note editing processing performed by the server apparatus 12.

The server apparatus 12 acquires the shopping note data 69 (see FIG. 14) from the mobile terminal 14.

Further, the server apparatus 12 compares the transaction code included in the payment completion information acquired from the POS terminal 16 and the transaction code of the product registration data 75 stored in the server apparatus 12 with each other to recognize that the customer corresponding to the customer code registered in the product registration data 75 has purchased the product registered in the product registration data 75.

Further, the server apparatus 12 determines whether or not the purchased product is registered in the shopping note data 69 of the customer corresponding to the same customer code.

The server apparatus 12 deletes, in the case where it is determined that the customer corresponding to the same customer code as the customer code registered in the shopping note data 69 has purchased the product registered in the shopping note data 69, the information relating to the purchased product from the shopping note data 69. In this way, as shown in FIG. 18, the server apparatus 12 edits the shopping note 90 to generate a shopping note 103. The shopping note 103 is one obtained by deleting the product B purchased by the customer from the shopping note 90. The shopping note data 69 edited in this way is output from the server apparatus 12 to the mobile terminal 14. The customer can browse the shopping note 103 from which the product B has been deleted, in the mobile terminal 14.

Further, the server apparatus 12 acquires, from the POS terminal 16, stock information indicating the stock quantity of a product. The server apparatus 12 reads, from the acquired stock information, the stock quantity of the product registered in the shopping note 90. Further, the server apparatus 12 additionally registers the read stock quantity in the shopping note data 69. In this way, as shown in FIG. 18, the server apparatus 12 edits the shopping note 90 to generate a shopping note 104. The shopping note 104 is one obtained by adding the stock quantity of a product to the shopping note 90. The shopping note data 69 edited in this way is output from the server apparatus 12 to the mobile terminal 14. The customer can browse the shopping note 104 to which the stock quantity of a product has been added, in the mobile terminal 14.

(Flow of Processing Performed by Shopping Support System)

Figure 19:
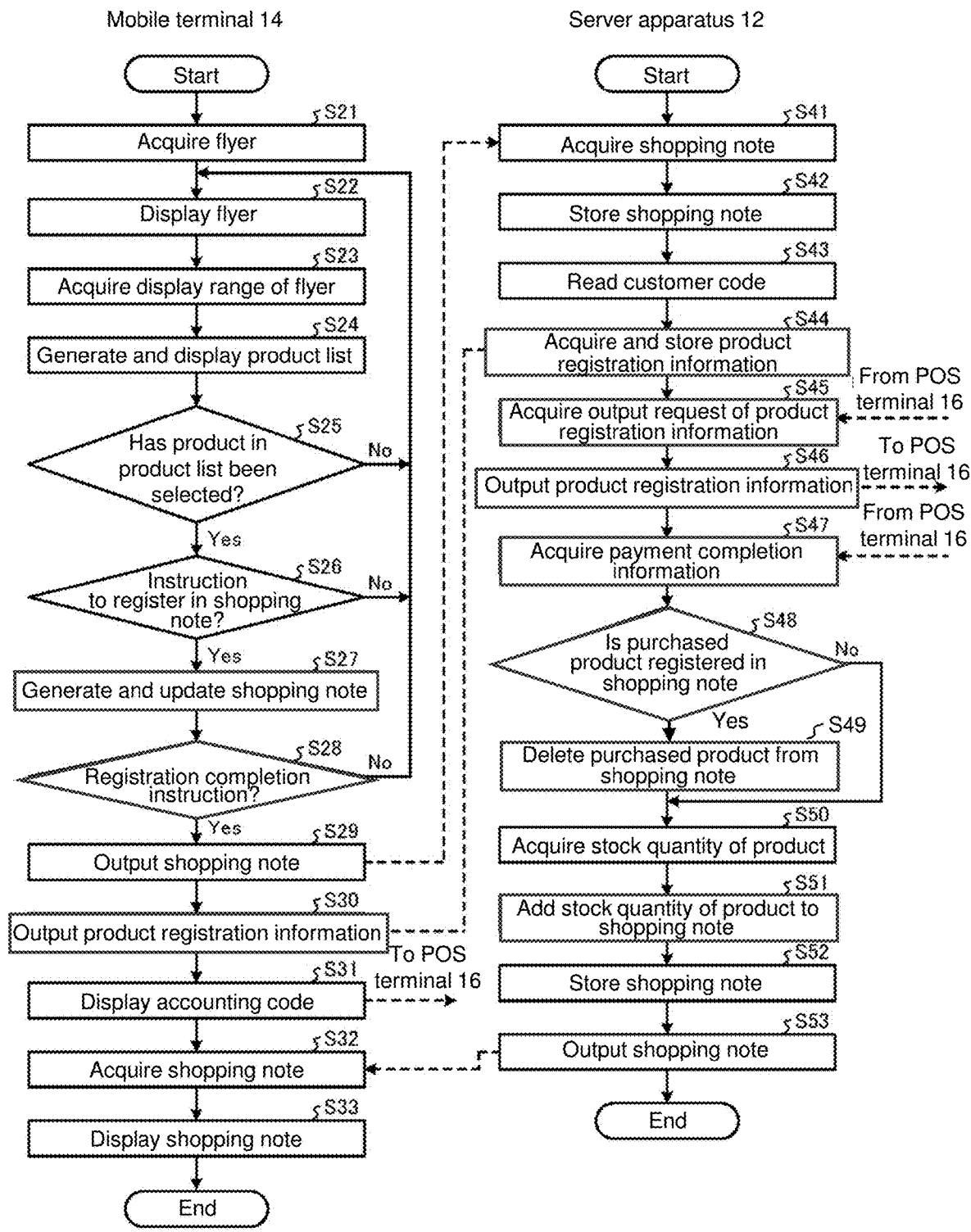
FIG. 19 is a flowchart showing an example of processing performed by the shopping support system according to the second embodiment.

A flow of processing performed by the shopping support system 11 will be described with reference to FIG. 19. FIG. 19 is a flowchart showing an example of processing performed by the shopping support system according to the second embodiment.

Processing performed by a controller 21b (see FIG. 1) of the mobile terminal 14 will be described first.

Since the processing from Step S21 to Step S28 performed by the controller 21b of the mobile terminal 14 is the same as the processing from Step S11 to Step S18 (see FIG. 9) performed by the controller 21a of the mobile terminal 10 in the first embodiment, description thereof is omitted.

In Step S28 in FIG. 19, in the case where it is determined that there is a registration completion instruction of the shopping note 90 (Step S28: Yes), the processing of the controller 21b proceeds to Step S29. In Step S29, the controller 21b outputs, by the function of the shopping note output unit described above, the shopping note 90 (shopping note data 28) generated by the mobile terminal 14 to the server apparatus 12.

In Step S30, the product registration unit 59 (see FIG. 8) of the controller 21b causes, when a customer shops, the camera 20 included in the mobile terminal 14 to read the product code attached to a product to be purchased. Further, the product registration unit 59 transmits the read product code to the server apparatus 12 together with a transaction code and a customer code. That is, the mobile terminal 14 outputs product registration information including the read product code, the transaction code, and the customer code to a server.

In Step S31, the payment instruction unit 60 of the controller 21b displays, upon receiving an accounting instruction by a customer's operation, an accounting code on the display device 30 of the mobile terminal 14. Further, the customer causes the POS terminal 16 to read the displayed accounting code.

In Step S32, the controller 21b acquires, by the function of the shopping note acquisition unit described above, the edited shopping note 90 (shopping note data 69) from the server apparatus 12.

In Step S33, the display control unit 50 of the controller 21b displays the shopping note 90 on the display device 30. After that, the controller 21b of the mobile terminal 14 ends the processing shown in FIG. 19.

Next, a flow of processing performed by the server apparatus 12 will be described.

In Step S41 in FIG. 19, the shopping note acquisition unit 111 of the controller 61 acquires the shopping note 90 (shopping note data 28) from the mobile terminal 14.

In Step S42, the shopping note storage unit 112 of the controller 61 stores, as the shopping note data 69, the shopping note data 28 acquired in Step S41 in the storage device 65.

In Step S43, the product-registration-information acquisition unit 113 of the controller 61 reads a customer code from the shopping note data 69 acquired in Step S41.

In Step S44, the product-registration-information acquisition unit 113 of the controller 61 acquires product registration information from the mobile terminal 14 and stores the acquired product registration information in the product registration data 75.

In Step S45, the POS terminal cooperation unit 114 of the controller 61 acquires an output request of product registration information from the POS terminal 16.

In Step S46, the POS terminal cooperation unit 114 of the controller 61 outputs the requested product registration information to the POS terminal 16.

In Step S47, the POS terminal cooperation unit 114 of the controller 61 acquires payment completion information indicating that payment has been completed, which is output by the payment-completion-information output unit described above of the POS terminal 16.

In Step S48, the product-registration-information acquisition unit 113 of the controller 61 determines whether or not a product purchased by a customer is registered in the shopping note data 69. In the case where it is determined that a product purchased by a customer is registered in the shopping note data 69 (Step S48: Yes), the processing of the controller 61 proceeds to Step S49. Meanwhile, in the case where it is determined that a product purchased by a customer is not registered in the shopping note data 69 (Step S48: No), the processing of the controller 61 proceeds to Step S50.

In Step S49, the shopping note edition unit 116 of the controller 61 deletes, from the shopping note data 69, the information relating to the product purchased by the customer. After that, the processing of the controller 61 proceeds to Step S50.

Meanwhile, in Step S50, the stock quantity acquisition unit 115 of the controller 61 acquires the stock quantity of a product output by the product-stock-quantity output unit described above of the POS terminal 16.

In Step S51, the shopping note edition unit 116 of the controller 61 adds the stock quantity of the registered product to the shopping note data 69.

In Step S52, the shopping note storage unit 112 of the controller 61 stores the edited shopping note data 69 in the storage device 65.

In Step S53, the shopping note output unit 117 of the controller 61 outputs the edited shopping note 90 (shopping note data 69) to the mobile terminal 14. After that, the server apparatus 12 ends the processing shown in FIG. 19. Note that the server apparatus 12 checks the stock quantity of a product at predetermined timing. That is, the processing from Step S50 to Step S53 in FIG. 19 is periodically repeated.

Note that the roles of registration and payment of purchased products assigned to the mobile terminal 14, the server apparatus 12, and the POS terminal 16 are not limited to the example shown in FIG. 19. For example, the mobile terminal 14 itself may perform processing from registration processing of a product to payment processing.

(Operation and Effect of Second Embodiment)

As described above, the controller 61 (product-registration-information acquisition unit 113) of the server apparatus 12 included in the shopping support system 11 according to this embodiment acquires the registered information of the product registered in the shopping note 90 by the mobile terminal 14 by a customer. Further, in the POS terminal 16, under the condition that payment of the product registered in the product registration information has been completed, the controller 61 (shopping note edition unit 116) deletes the information relating to the product from the shopping note 90. Therefore, when the product registered in the shopping note 90 is purchased, the information relating to the product is deleted from the shopping note 90 without performing a special operation, so that it is possible to easily manage the shopping note 90.

Further, the controller 61 (stock quantity acquisition unit 115) of the server apparatus 12 included in the shopping support system 11 according to this embodiment acquires, from the POS terminal 16, the stock quantity of the product registered in the shopping note 90. The controller 61 (stock quantity acquisition unit 115) adds the acquired stock quantity to the shopping note 90. Therefore, a customer can check the stock quantity registered by himself/herself in the shopping note 90 in real time. As a result, it is possible to determine the timing to shop.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A shopping note support system, comprising:

a mobile terminal that registers information of a purchased product;

a payment terminal that performs payment processing on a basis of the registered information of a purchased product; and a server apparatus that is communicably connected to the mobile terminal and the payment terminal via a network and controls an operation of the entire system, the mobile terminal including a display device that displays information for supporting shopping of products, a display screen for displaying the information having a first display region and a second display region, a first storage device that stores data regarding shopping of products, the data including data of a flyer containing pieces of information of products sold in a store and data of a shopping note for purchasing a product, and a first controller configured to display the flyer in the first display region of the display device on a basis of the data of the flyer stored in the storage device, generate a product list containing information of a plurality of products included in the flyer, display the generated product list in the second display region of the display device such that a product is selectable by an operator, determine whether or not a product has been selected from the product list, generate, where it is determined that a product has been selected, data of a shopping note containing information of the selected product and store the generated data of the shopping note in the storage device, and display the shopping note in the second display region of the display device on a basis of the data of the shopping note stored in the storage device, the server apparatus including a communication interface that communicates with the mobile terminal and the payment terminal, a second storage device that has a product registration data file for storing the registered information of a purchased product and a shopping note data file for storing the data of the shopping note, and a second controller configured to acquire the data of the shopping note from the mobile terminal via the communication interface and store the acquired data of the shopping note in the shopping note data file, acquire the registered information of a purchased product included in the data of the shopping note from the mobile terminal via the communication interface and store the acquired registered information of a purchased product in the product registration data file, compare, upon acquiring payment completion information via the communication interface, the acquire payment completion information and the registered information stored in the product registration data file with each other to recognize that a product whose information is registered in the product registration data file has been purchased, determine whether or not the information of the product recognized to have been purchased is registered in the data of the shopping note stored in the shopping note data file, and delete, where it is determined that the information of the product recognized to have been purchased is registered in the data of the shopping note, the information of the product recognized to have been purchased from the data of the shopping note.

2. The shopping note support system according to claim 1, wherein the data of the shopping note includes information of a product registered as a product to be purchased, the information of the product including at least a product name, a selling price, and a sales date of the product.

3. The information processing apparatus according to claim 2, wherein the first controller is further configured to display, on the display device, at least that there is the product to be purchased, under a condition that the sales date included in the shopping note and a current date match.

4. The information processing apparatus according to claim 1, wherein the display device displays the first display region and the second display region on the same screen.

5. The information processing apparatus according to claim 1, wherein the first controller is further configured to generate a product list of a product displayed in the first display region, of the plurality of products included in the flyer.

6. The information processing apparatus according to claim 1, wherein the first controller is further configured to acquire information relating to a display range of the flyer displayed in the first display region of the display device, and generate, on a basis of the acquired information relating to a display range, a product list of a product included in the flyer displayed in the first display region.

7. The information processing apparatus according to claim 1, wherein the first controller is further configured to store, in the first storage device, the data of the shopping note for each store corresponding to the flyer, the shopping note being generated on a basis of the flyer.

8. The information processing apparatus according to claim 1, wherein the first controller is further configured to display the shopping note in one of a list format and a calendar format.

\* \* \* \* \*